US008222562B2

(12) United States Patent
Bastawros et al.

(10) Patent No.: US 8,222,562 B2
(45) Date of Patent: Jul. 17, 2012

(54) SYSTEMS FOR FORMING A PLURALITY OF CELLS ON THE MASTERING TOOLS

(75) Inventors: Adel F. Bastawros, Newburgh, IN (US); Grant Hay, Evansville, IN (US); Karkala Arun Kumar, Evansville, IN (US); Phil M. Peters, Mount Vernon, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/892,180

(22) Filed: Sep. 28, 2010

(65) Prior Publication Data

US 2011/0011837 A1    Jan. 20, 2011

Related U.S. Application Data

(62) Division of application No. 11/472,704, filed on Jun. 22, 2006, now Pat. No. 7,807,938.

(51) Int. Cl.
*B23K 26/00* (2006.01)
*B23K 26/04* (2006.01)
*B23K 26/36* (2006.01)
*B41F 31/26* (2006.01)

(52) U.S. Cl. ........... 219/121.62; 219/121.68; 430/270.1; 700/166

(58) Field of Classification Search ............. 219/121.61, 219/121.62, 121.67–121.72, 121.82, 121.83; 430/270.1; 700/166
See application file for complete search history.

(56) References Cited

U.S. PATENT DOCUMENTS

| | | | |
|---|---|---|---|
| 3,861,839 A | 1/1975 | Malik | |
| 4,377,736 A | 3/1983 | Daunt et al. | |
| 4,806,731 A | 2/1989 | Bragard et al. | |
| 4,947,023 A | 8/1990 | Minamida et al. | |
| 5,092,558 A | 3/1992 | Katsura | |
| 5,236,763 A | 8/1993 | Luthi | |
| 5,338,915 A | 8/1994 | Hildebrand et al. | |
| 5,383,199 A * | 1/1995 | Laudenslager et al. | 372/25 |
| 5,442,523 A | 8/1995 | Kashima et al. | |
| 5,501,926 A | 3/1996 | Cheng et al. | |
| 5,521,797 A | 5/1996 | Kashima et al. | |
| 5,527,497 A | 6/1996 | Kanome et al. | |
| 5,658,475 A | 8/1997 | Barenboim et al. | |
| 5,698,120 A * | 12/1997 | Kurosawa et al. | 219/121.62 |
| 5,820,810 A | 10/1998 | Hirata | |
| 5,822,211 A | 10/1998 | Barenboim et al. | |

(Continued)

FOREIGN PATENT DOCUMENTS

JP        07148508        6/1995

(Continued)

OTHER PUBLICATIONS

International Search Report; International Application No. PCT/US2005/025699; International Mailing Date: Oct. 28, 2005; 3 pages.

(Continued)

*Primary Examiner* — Samuel M Heinrich
(74) *Attorney, Agent, or Firm* — Cantor Colburn LLP

(57) ABSTRACT

Mastering tools and systems and methods for forming a plurality of cells on the mastering tools are provided. In particular, the systems vary the geometry of the cells or the placement of the cells, or both, for forming a textured surface on a mastering tool.

10 Claims, 36 Drawing Sheets

U.S. PATENT DOCUMENTS

| | | | |
|---|---|---|---|
| 5,944,405 A | 8/1999 | Takeuchi et al. | |
| 6,010,659 A | 1/2000 | Gentsch et al. | |
| 6,091,749 A * | 7/2000 | Hoffmaster et al. | 372/38.02 |
| 6,123,890 A | 9/2000 | Mazurek et al. | |
| 6,147,322 A | 11/2000 | Xuan et al. | |
| 6,285,001 B1 | 9/2001 | Fleming et al. | |
| 6,297,908 B1 | 10/2001 | Suga | |
| 6,452,653 B1 | 9/2002 | Yamanaka et al. | |
| 6,476,890 B1 | 11/2002 | Funahata et al. | |
| 6,583,936 B1 | 6/2003 | Kaminsky et al. | |
| 6,627,844 B2 | 9/2003 | Liu et al. | |
| 6,636,363 B2 | 10/2003 | Kaminsky et al. | |
| 6,721,102 B2 | 4/2004 | Bourdelais et al. | |
| 7,092,163 B2 | 8/2006 | Bastawros et al. | |
| 7,247,813 B2 * | 7/2007 | Jyumonji et al. | 219/121.83 |
| 7,280,277 B2 | 10/2007 | Bastawros et al. | |
| 7,304,265 B2 * | 12/2007 | Otsu et al. | 219/121.62 |
| 7,445,409 B2 | 11/2008 | Trice et al. | |
| 2002/0018161 A1 | 2/2002 | Yamanaka et al. | |
| 2002/0027627 A1 | 3/2002 | Yamada et al. | |
| 2002/0033915 A1 | 3/2002 | Masaki et al. | |
| 2002/0191134 A1 | 12/2002 | Funahata et al. | |
| 2003/0025852 A1 | 2/2003 | Ishitake | |
| 2003/0030372 A1 | 2/2003 | Masaki et al. | |
| 2003/0059578 A1 | 3/2003 | Williams et al. | |
| 2003/0096661 A1 | 5/2003 | Kim | |
| 2003/0169499 A1 | 9/2003 | Bourdelais et al. | |
| 2003/0169512 A1 | 9/2003 | Bourdelais et al. | |
| 2003/0169513 A1 | 9/2003 | Kaminsky et al. | |
| 2003/0170442 A1 | 9/2003 | Kaminsky et al. | |
| 2003/0223533 A1 | 12/2003 | Hsieh et al. | |
| 2004/0022499 A1 | 2/2004 | Shimizu et al. | |
| 2004/0068167 A1 | 4/2004 | Hsieh et al. | |
| 2004/0080725 A1 | 4/2004 | Kaminsky et al. | |
| 2004/0120136 A1 | 6/2004 | Olczak et al. | |
| 2004/0173927 A1 | 9/2004 | Trajkovska-Petkoska et al. | |
| 2004/0241049 A1 | 12/2004 | Carvalho | |
| 2004/0245660 A1 | 12/2004 | Ohtsu et al. | |
| 2007/0009572 A1 | 1/2007 | Mary Chan et al. | |
| 2007/0134362 A1 | 6/2007 | Heidari | |
| 2007/0297480 A1 | 12/2007 | Bastawros et al. | |

FOREIGN PATENT DOCUMENTS

| | | |
|---|---|---|
| WO | 03032074 A1 | 4/2003 |

OTHER PUBLICATIONS

International Search Report; International Application No. PCT/US2007/070881; International Mailing Date: May 2, 2008; 4 pages.

Written Opinion of the International Searching Authority; International Application No. PCT/US2007/070881; International Filing Date: Jun. 11, 2007; International Mailing Date: May 2, 2008; 13 pages.

International Search Report; International Application No. PCT/US2007/071225; International Mailing Date : Dec. 7, 2007; 3 pages.

* cited by examiner

Hexagonal Close Packed Pattern with Cell Geometry Randomization

Hexagonal Close Packed Pattern without Cell Geometry Randomization

FIG. 11

| Focal Length of Focusing Lens | 40mm | 50mm | 80mm | |
|---|---|---|---|---|
| Cell Opening Size Range | 10-25 μm | 15-35 μm | 25-50 μm | 50-100 μm |
| Maximum Aspect Ratio (Depth/Size) | 1.25-1.0 | 1.0-0.8 | 0.9-0.7 | 0.7-0.5 |
| Minimum Aspect Ratio | 0 | 0 | 0 | 0 |
| Average Laser Power (W) | 1-5 | 3-8 | 6-10 | 10-20 |
| Laser Light Pulse Duration (μsec) | 6.1 | 6.1 | 6.1 | 8.3 |
| Working Range | +/- 30 μm | +/- 60 μm | +/- 100 μm | +/- 100 μm |

| Focal Length of Focusing Lens | 40mm | 50mm | 80mm | |
|---|---|---|---|---|
| Cell Size Range | 10-25 μm | 15-35 μm | 25-50 μm | 50-100 μm |
| Maximum Aspect Ratio (Depth/Size) | 1.25-1.0 | 1.0-0.8 | 0.9-0.7 | 0.7-0.5 |
| Minimum Aspect Ratio | 0 | 0 | 0 | 0 |
| Average Laser Power (W) | 1-15 | 5-25 | 15-50 | 50-100 |
| Pulse Length (μsec) | 2.8 | 3.3 | 3.7 | 3.7 |
| Working Range | +/- 30 μm | +/- 60 μm | +/- 100 μm | +/- 100 μm |

Cell locations with Cell Placement Randomization in one direction (constant gap between rows of cells)

Cell locations with Cell Placement Randomization in two directions (varying gap between rows of cells)

SYSTEMS FOR FORMING A PLURALITY OF CELLS ON THE MASTERING TOOLS

CROSS REFERENCE TO RELATED APPLICATION

The application is a divisional application of U.S. application Ser. No. 11/472,704, filed on Jun. 22, 2006, the contents of which are incorporated herein by reference thereto.

BACKGROUND OF THE INVENTION

The inventors herein have developed deterministic textured surfaces on mastering tools. However, the textured surfaces can have unintentional formations of interference patterns superposed on a basic texture pattern. Further, the unintentional patterns significantly deteriorate the mastering tool's aesthetic and cosmetic performance. Such patterns may include moiré patterns, banding patterns, barring patterns, striping patterns, brush-line patterns, wood-grain patterns, or color non-uniformity of the mastering tool. It is noted that coarse patterns with relatively large cell opening sizes (e.g., greater than 100 microns) are less prone to such issues. As cell opening sizes become relatively small these issues are more prone to occur.

In particular, when manufacturing mastering tools having highly engineered deterministic textures, the high regularity of texture elements makes them prone to mechanical inaccuracies or vibrations of a texturing setup and any small inaccuracies in the texturing process. Further, some level of inaccuracies is present in any texturing setup. The interaction/interference of such errors and the regular texture elements lead to the formation of undesirable bands or patterns. Further, mastering tools with highly engineered textures used to make an optical film or sheet, will transfer any regular or irregular bands or patterns to the film or sheet, if the mastering tools themselves have such patterns.

Accordingly, the inventors herein have recognized a need for improved systems and methods that form a plurality of cells on a mastering tool having varying cell geometry sizes and cell placement locations that can minimize and/or eliminate undesirable banding or patterns on the mastering tools.

BRIEF DESCRIPTION OF THE INVENTION

A system for forming a plurality of cells on a mastering tool can comprise: a laser configured to emit a first laser light pulse having a first power level, and to emit a second laser light pulse having a third power level, a controller, and at least one of a light attenuating device and a light position shifting device. The controller configured to operably communicate with the laser configured to generate a first signal having an amplitude that is based on a first amplitude value, the first amplitude value being one of a plurality of amplitude values associated with at least one of (i) a predetermined distribution of cell opening sizes within a range of cell opening sizes for the mastering tool and (ii) a predetermined distribution of position error distances for cells on the mastering tool within a range of position error distances, wherein the controller is further configured to generate a second signal having an amplitude that is based on a second amplitude value, wherein (i) the second amplitude value is one of a plurality of amplitude values associated with the predetermined distribution of cell opening sizes, and/or (ii) the second amplitude value is one of the plurality of amplitude values associated with the predetermined distribution of position error distances for cells on the mastering tool. The light attenuating device can be configured to receive the first laser light pulse and the first signal, the light attenuating device further configured to attenuate the first laser light pulse to a second power level in response to the first signal, such that the first laser light pulse forms a first cell having a first cell opening size at a first location on the mastering tool, wherein the light attenuating device is further configured to receive the second laser light pulse and the second signal, the light attenuating device further configured to attenuate the second laser light pulse to a fourth power level in response to the second signal such that the second laser light pulse forms a second cell having a second cell opening size at a second location on the mastering tool. The light position shifting device can be operably coupled to a first device, the first device configured to adjust an operational parameter of the light position shifting device in response to the first signal, the light position shifting device configured to direct the first laser light pulse such that the first laser light pulse forms a first cell at a first location on the mastering tool after the operational parameter of the light position shifting device is adjusted in response to the first signal, wherein the light position shifting device further configured to direct the second laser light pulse such that the second laser light pulse forms a second cell at a second location on the mastering tool after the operational parameter of the light position shifting device is adjusted in response to the second signal.

A system for forming a plurality of cells on a mastering tool in accordance with another exemplary embodiment is provided. The system includes a laser configured to emit a first laser light pulse having a first power level. The system further includes a controller operably communicating with the laser configured to generate a first signal having an amplitude that is based on a first amplitude value. The first amplitude value is one of a plurality of amplitude values associated with a predetermined distribution of cell opening sizes within a range of cell opening sizes for the mastering tool. The system further includes a light attenuating device configured to receive the first laser light pulse and the first signal. The light attenuating device is further configured to attenuate the first laser light pulse to a second power level in response to the first signal, such that the first laser light pulse forms a first cell having a first cell opening size at a first location on the mastering tool. The laser is further configured to emit a second laser light pulse having a third power level. The controller is further configured to generate a second signal having an amplitude that is based on a second amplitude value. The second amplitude value is one of a plurality of amplitude values associated with the predetermined distribution of cell opening sizes. The light attenuating device is further configured to receive the second laser light pulse and the second signal. The light attenuating device is further configured to attenuate the second laser light pulse to a fourth power level in response to the second signal such that the second laser light pulse forms a second cell having a second cell opening size at a second location on the mastering tool.

A system for forming a plurality of cells on a mastering tool in accordance with another exemplary embodiment is provided. The system includes a laser configured to emit a first laser light pulse. The system further includes a controller operably communicating with the laser configured to generate a first signal having an amplitude that is based on a first amplitude value. The first amplitude value is one of a plurality of amplitude values associated with a predetermined distribution of position error distances for cells on the mastering tool within a range of position error distances. The system further includes a light position shifting device operably coupled to a first device. The first device configured to adjust an operational parameter of the light position shifting device in response to the first signal. The light position shifting device configured to direct the first laser light pulse such that the first laser light pulse forms a first cell at a first location on the mastering tool after the operational parameter of the light position shifting device is adjusted in response to the first signal. The laser is further configured to emit a second laser light pulse. The controller is further configured to generate a second signal having an amplitude that is based on a second amplitude value. The second amplitude value is one of the plurality of amplitude values associated with the predetermined distribution of position error distances for cells on the mastering tool. The first device is further configured to adjust the operational parameter of the light position shifting device in response to the second signal. The light position shifting device is further configured to direct the second laser light pulse such that the second laser light pulse forms a second cell at a second location on the mastering tool after the operational parameter of the light position shifting device is adjusted in response to the second signal.

A system for forming a plurality of cells on a mastering tool in accordance with another exemplary embodiment is provided. The system includes a laser configured to emit a first laser light pulse having a first power level. The system further includes a controller operably communicating with the laser configured to generate a first signal having an amplitude that is based on a first amplitude value. The first amplitude value is one of a plurality of amplitude values associated with a first predetermined distribution of position error distances for cells on the mastering tool within a range of position error distances. The system further includes a light position shifting device operably coupled to a first device. The first device is configured to adjust an operational parameter of the light position shifting device in response to the first signal. The controller is further configured to generate a second signal having an amplitude that is based on a second amplitude value. The second amplitude value is one of a plurality of amplitude values associated with a second predetermined distribution of cell opening sizes within a range of cell opening sizes for the mastering tool. The light attenuating device is configured to attenuate the first laser light pulse to a second power level in response to the second signal. The light position shifting device is configured to direct the attenuated first laser light pulse such that the first laser light pulse forms a first cell having a first cell opening size at a first location on the mastering tool, after the operational parameter of the light position shifting device is adjusted in response to the first signal. The laser is further configured to emit a second laser light pulse having a third power level. The controller is further configured to generate a third signal having an amplitude that is based on a third amplitude value associated with the first predetermined distribution of position error distances for cells on the mastering tool. The first device is further configured to adjust the operational parameter of the light position shifting device in response to the third signal. The controller is further configured to generate a fourth signal having an amplitude that is based on a fourth amplitude value associated with the second predetermined distribution of cell opening sizes. The light attenuating device is further configured to attenuate the second laser light pulse to a fourth power level in response to the fourth signal. The light position shifting device is further configured to direct the attenuated second laser light pulse such that the second laser light pulse forms a second cell having a second cell opening size at a second location on the mastering tool, after the operational parameter of the light position shifting device is adjusted in response to the third signal.

A method for forming a plurality of cells on a mastering tool in accordance with another exemplary embodiment is provided. The method includes emitting a first plurality of laser light pulses at a first commanded power level to form a first plurality of cells on the mastering tool. The method further includes measuring an average power level associated with the first plurality of laser light pulses. The method further includes calculating an average power error value based on the measured average power level and a desired average power level. The method further includes calculating a second commanded power level based on the first commanded power level and the average power error value. The method further includes emitting a second plurality of laser light pulses at the second commanded power level to form a second plurality of cells on the mastering tool.

A system for forming a plurality of cells on a mastering tool in accordance with another exemplary embodiment is provided. The system includes a laser configured to emit a first plurality of laser light pulses at a first commanded power level to form a first plurality of cells on the mastering tool. The system further includes a power monitoring sensor configured to measure an average power level of the first plurality of laser light pulses. The system further includes a controller operably coupled to the power monitoring sensor and the laser. The controller is configured to calculate an average power error value based on the measured average power level and a desired average power level. The controller is further configured to calculate a second commanded power level based on the first commanded power level and the average power error value. The controller is further configured to emit a second plurality of laser light pulses at the second commanded power level to form a second plurality of cells on the mastering tool.

A mastering tool in accordance with another exemplary embodiment is provided. The mastering tool includes a cylindrical drum having a plurality of cells. The plurality of cells have a predetermined distribution of cell opening sizes within a range of cell opening sizes.

A mastering tool in accordance with another exemplary embodiment is provided. The mastering tool includes a cylindrical drum having a plurality of cells. The plurality of cells are positioned on the cylindrical drum such that the plurality of cells have a predetermined distribution of position error distances within a range of position error distances.

A mastering tool in accordance with another exemplary embodiment is provided. The mastering tool includes a plate member having a plurality of cells. The plurality of cells have a predetermined distribution of cell opening sizes within a range of cell opening sizes.

A mastering tool in accordance with another exemplary embodiment is provided. The mastering tool includes a plate member having a plurality of cells. The plurality of cells are positioned on the plate member such that the plurality of cells have a predetermined distribution of position error distances within a range of position error distances.

BRIEF DESCRIPTION OF THE DRAWINGS

FIG. 11 is a table of exemplary operational parameters of the system of FIG. 1, utilizing a YAG laser, for forming a plurality of cells on a mastering tool;

FIG. 12 is a table of exemplary operational parameters of an alternative embodiment of the system of FIG. 1, utilizing a Ytterbium fiber laser, for forming a plurality of cells on a mastering tool;

DETAILED DESCRIPTION OF THE INVENTION

Figure 1:
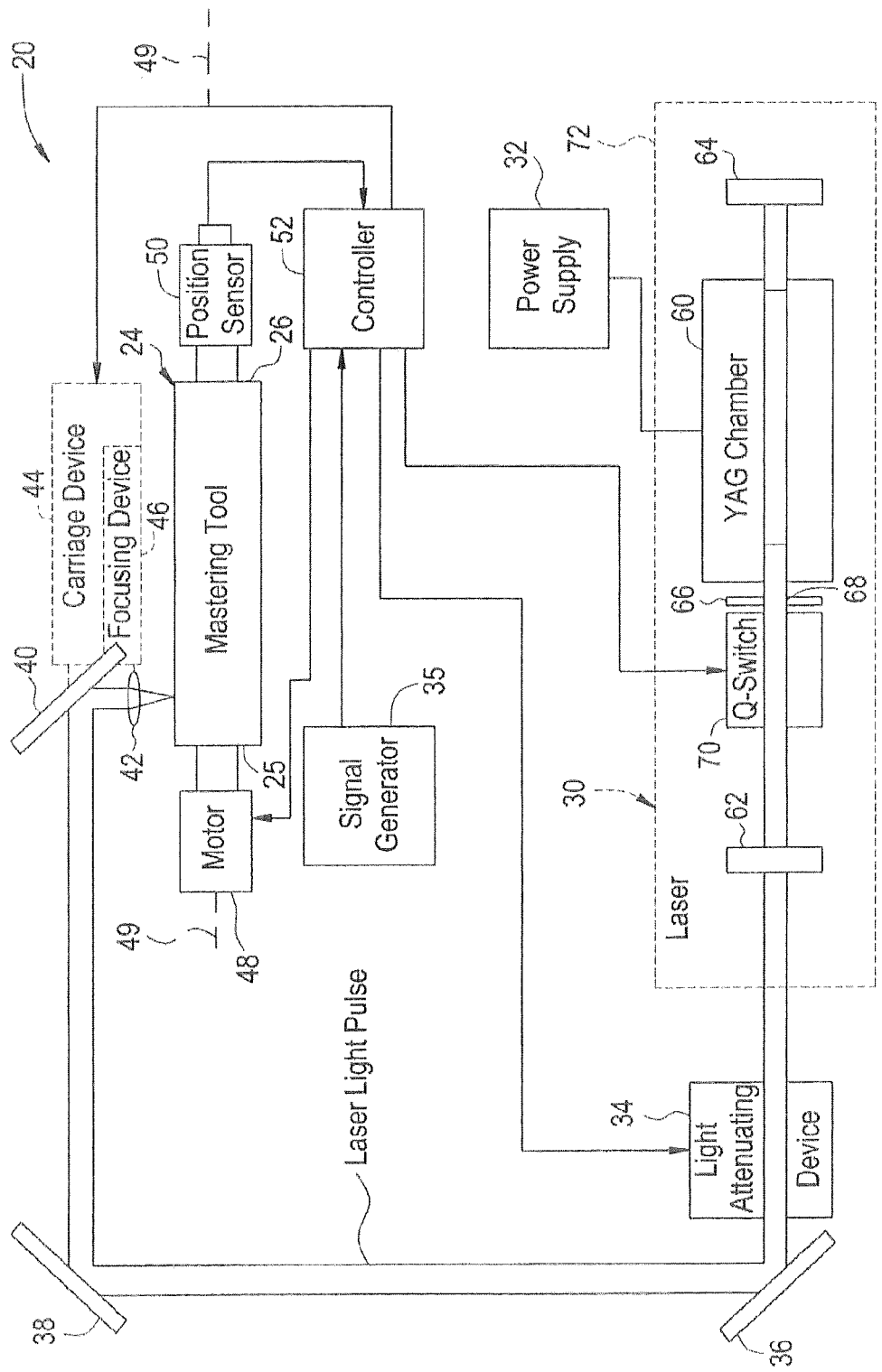
FIG. 1 is a schematic of a system for forming a plurality of cells on a mastering tool utilizing cell geometry randomization in accordance with an exemplary embodiment.

Referring to FIG. 1, a system 20 forming a plurality of cells on a mastering tool 24 is provided. A cell is defined as a cavity that extends from an outer surface of a mastering tool into a mastering tool. Each cell has an aspect ratio that is defined as a depth of a cell divided by a size of a cell opening. A mastering tool is defined as any tool having a plurality of cells that are configured to form a textured surface on another material. For example, a mastering tool can define a textured surface on a film or a sheet of material. Further, a shape or configuration of the mastering tool can vary based on the desired application. In the illustrated exemplary embodiment, the mastering tool 24 comprises a cylindrical drum. It an alternative exemplary embodiment, the mastering tool comprises a plate (not shown). In one exemplary embodiment, the mastering tool is constructed from steel with an outer chrome surface. In another exemplary embodiment, the mastering tool is constructed from steel with an outer ceramic surface. An advantage of the system 20 is that the system 20 utilizes a geometry randomization methodology to vary an aspect ratio of cells formed on the mastering tool 24 by varying a power level of laser light pulses contacting the mastering tool 24. As a result, the mastering tool 24 has a textured surface that can form a textured film that does not have the undesirable banding and patterns discussed above. The system 20 includes a laser 30, a power supply 32, a light attenuating device 34, a signal generator 35, mirrors 36, 38, 40, a focusing lens 42, a carriage device 44, a focusing device 46, a motor 48, a position sensor 50, and a controller 52.

The laser 30 is provided to generate a plurality of laser light pulses that are used to form a plurality of cells on the mastering tool 24. In the illustrated exemplary embodiment, the laser 30 comprises a single mode Q-switched YAG laser. It should be noted that in alternative embodiments, the laser 30 can comprise any known laser capable of forming cells on a mastering tool. For example, in an alternative embodiment the laser 30 comprises a single mode continuous-mode Ytterbium fiber laser. The laser 30 is controlled via the control signal from the controller 52. Further, the laser 30 receives electrical power from the power supply 32. The laser 30 includes a YAG chamber 60, mirrors 62, 64, a plate 66, a Q-switch 70, and a housing 72 configured to hold the foregoing components.

The YAG chamber 60 is provided to generate a laser light beam in response to electrical power being received from the power supply 32. The light propagates through a plate 66 having an aperture 68 extending therethrough. The diameter of the light beam passing through the aperture 68 has a diameter and a mode shape that is substantially dependent on the diameter of the aperture 68. In one exemplary embodiment, the diameter of the aperture 68 is 1 millimeter. Of course, the aperture 68 could have a diameter less than or greater than 1 millimeter. The laser light beam is intermittently switched through the Q-switch 70 as laser light pulses to the mirror 62 in response to the Q-switch 70 receiving control signals from the controller 52. The mirror 62, the mirror 64, and the YAG chamber 60 are utilized to generate a continuous laser light beam as known by those skilled in the art. The aperture 68 in the plate 66 controls the mode, size, and quality of the laser light beam. The Q-switch 70 is utilized to emit relatively high intensity laser light pulses toward the light attenuating device 34, instead of the continuous laser light beam.

The signal generator 35 is provided to generate a plurality of amplitude values that are received by the controller 52 and subsequently utilized by the controller 52 to induce the light attenuating device 34 to vary power levels of laser light pulses utilized to form a plurality of cells on the mastering tool 24. It should be noted that by varying a power level of laser light pulses, the cell opening sizes and the cell depths of cells formed on the mastering tool 24 can be varied.

Figure 4:
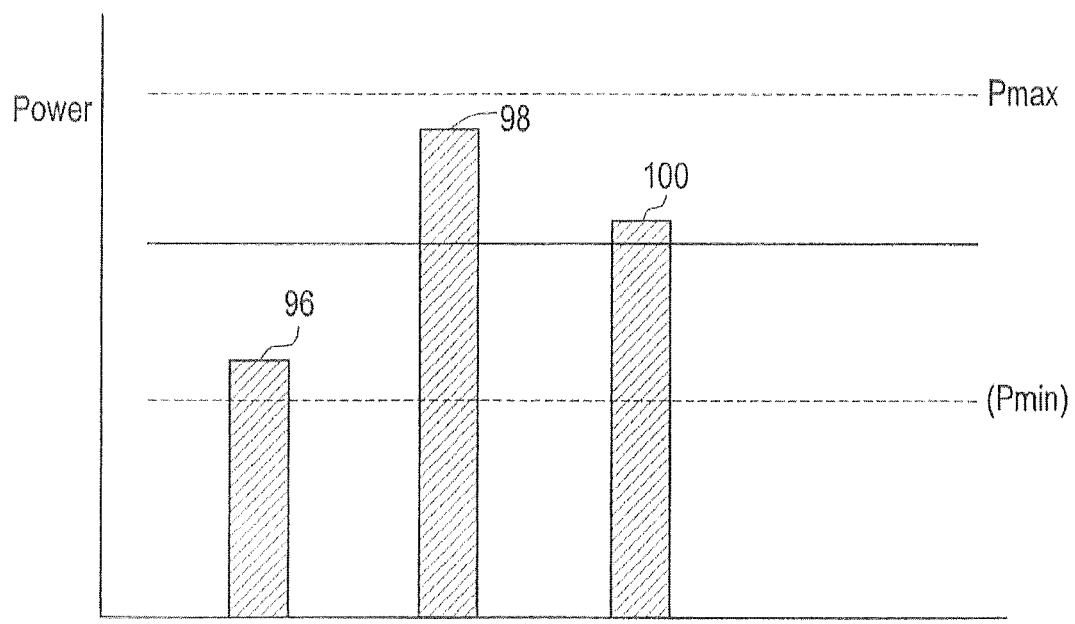
FIG. 4 is a schematic of exemplary laser light pulse power levels utilized in the system of FIG. 1 to form cells on a mastering tool.

The light attenuating device 34 is provided to attenuate power levels of a plurality of laser light pulses received from the laser 30, based on control signals from the controller 52. In particular, the light attenuating device 34 receives each laser light pulse at a power level from the laser 30 and attenuates the laser light pulse to another power level, based on the control signal from the controller 35. The light attenuating device 34 is disposed between the laser 30 and the mirror 36. Referring to FIG. 4, the light attenuating device 34, varies a power level of laser light pulses 96, 98, 100 between a maximum power level (Pmax) and a minimum power level (Pmin).

Referring again to FIG. 1, the mirror 36 is provided to receive laser light pulses from the light attenuating device 34 and to reflect the laser light pulses to the mirror 38. In the illustrated embodiment, the mirror 36 is a stationary mirror. However, in an alternative embodiment, the mirror 36 is configured as a moveable mirror whose position can be changed based on a control signal from the controller 52, to vary a direction of reflected laser light pulses toward the mirror 38.

The mirror 38 is provided to receive laser light pulses from the mirror 36 and to reflect the laser light pulses to the mirror 40. In the illustrated embodiment, the mirror 38 is a stationary mirror. However, in an alternative embodiment, the mirror 38 is configured as a moveable mirror whose position can be changed based on a control signal from the controller 52, to vary a direction of reflected laser light pulses toward the mirror 40.

The mirror 40 is provided to receive laser light pulses from the mirror 38 and to reflect the laser light pulses to the focusing lens 42. The mirror 40 is coupled to the carriage device 44 that moves the mirror 40 generally parallel to the mastering tool 46 from an end 25 to an end 26 of the mastering tool 24.

An optical component, such as the focusing lens 42 for example, is provided to receive a plurality of laser light pulses from the mirror 40 and to focus each of the laser light pulses. In one exemplary embodiment, the focusing lens has a focal length of 40 millimeters. In alternative embodiments, the focusing lens 42 has a focal length of 50 millimeters and 80 millimeters. Of course, the focusing lens 42 can have focal lengths between 40-80 millimeters, or less than 40 millimeters, or greater than 80 millimeters. Of course, in alternative embodiments, the optical component can be a group or a system of lenses having the functionality of focusing the laser light pulses on the mastering tool. Further, the optical component can comprise an optical fiber (not shown) with a predetermined facet which delivers the laser light pulses to the mastering tool to form cells on the mastering tool.

Figure 7:
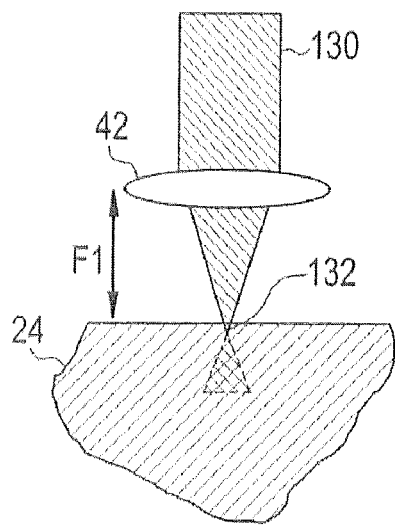
FIG. 7 is a schematic illustrating an exemplary focal point of a laser light pulse at an outer surface of a mastering tool.
Figure 8:
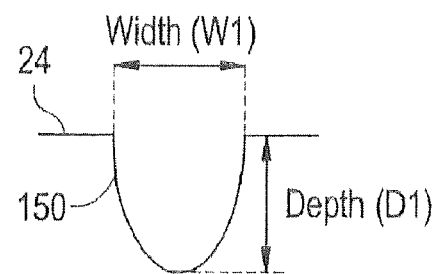
FIG. 8 is a cross-sectional schematic of a portion of a mastering tool illustrating a cell formed on the mastering tool by the laser light pulse of FIG. 7.
Figure 9:
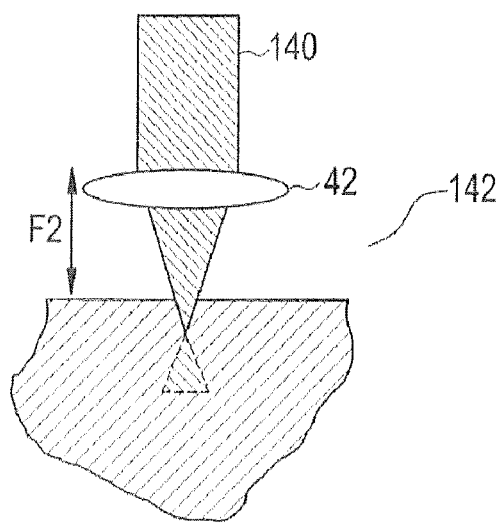
FIG. 9 is a schematic illustrating another exemplary focal point of another laser light pulse at an outer surface of a mastering tool.
Figure 10:
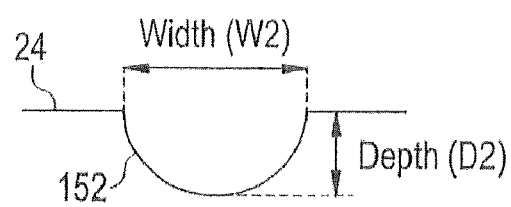
FIG. 10 is a cross-sectional schematic of a portion of a mastering tool illustrating a cell formed on the mastering tool by the laser light pulse of FIG. 9.
Figure 13:
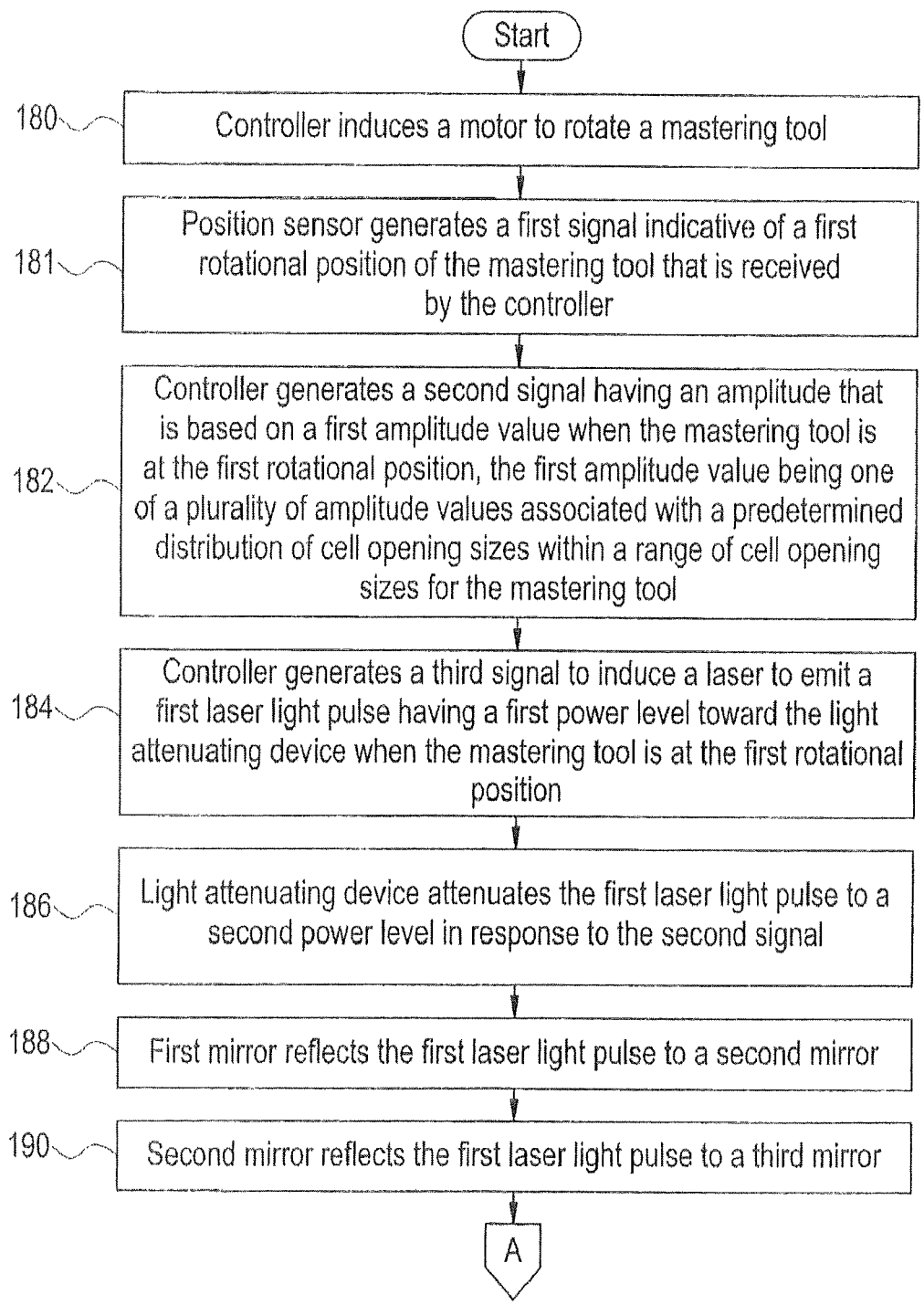
FIGS. 13-17 are flowcharts of a method for forming a plurality of cells on a mastering tool utilizing the system of FIG. 1 in accordance with another exemplary embodiment.
Figure 14:
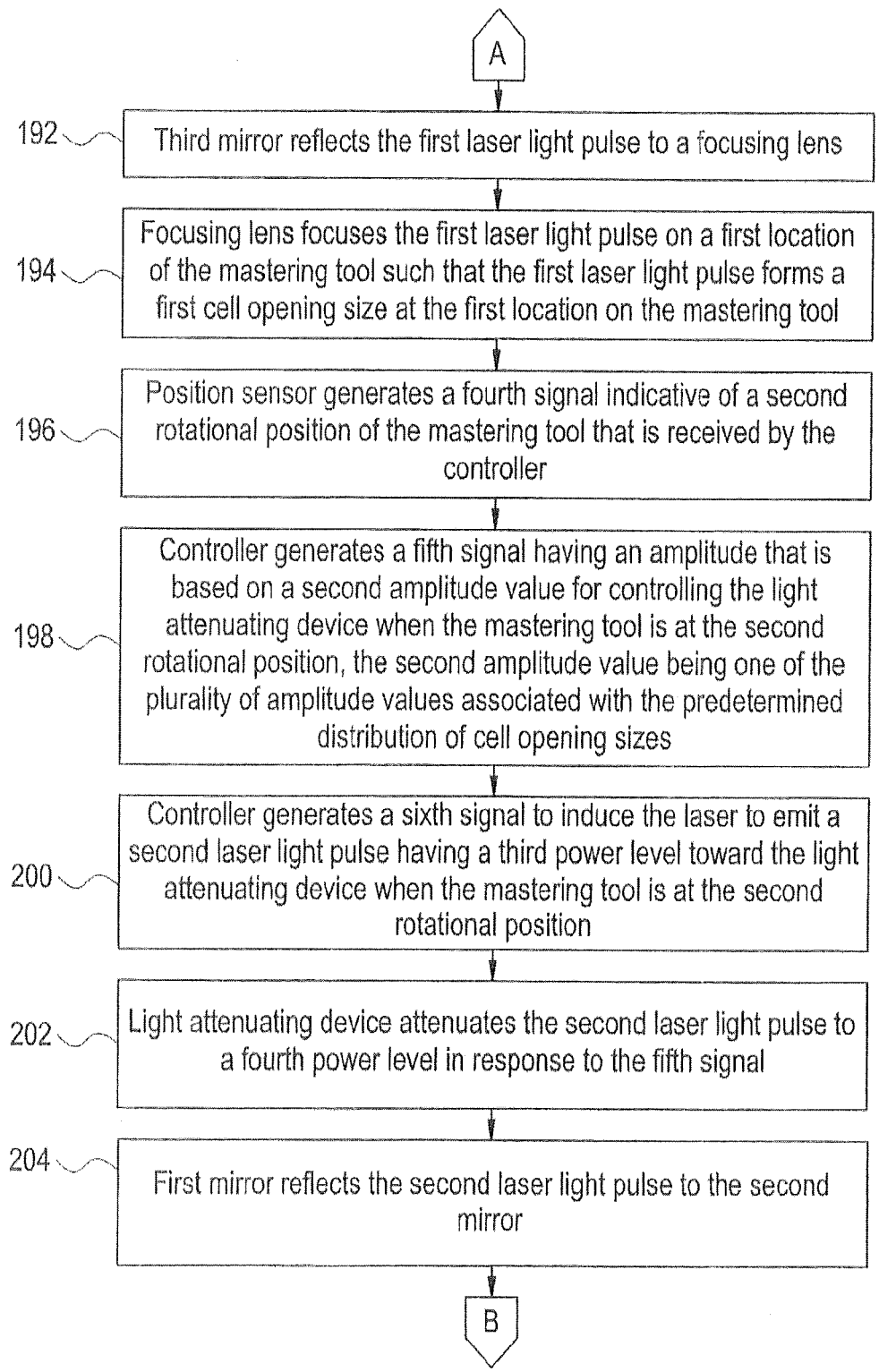
Figure 15:
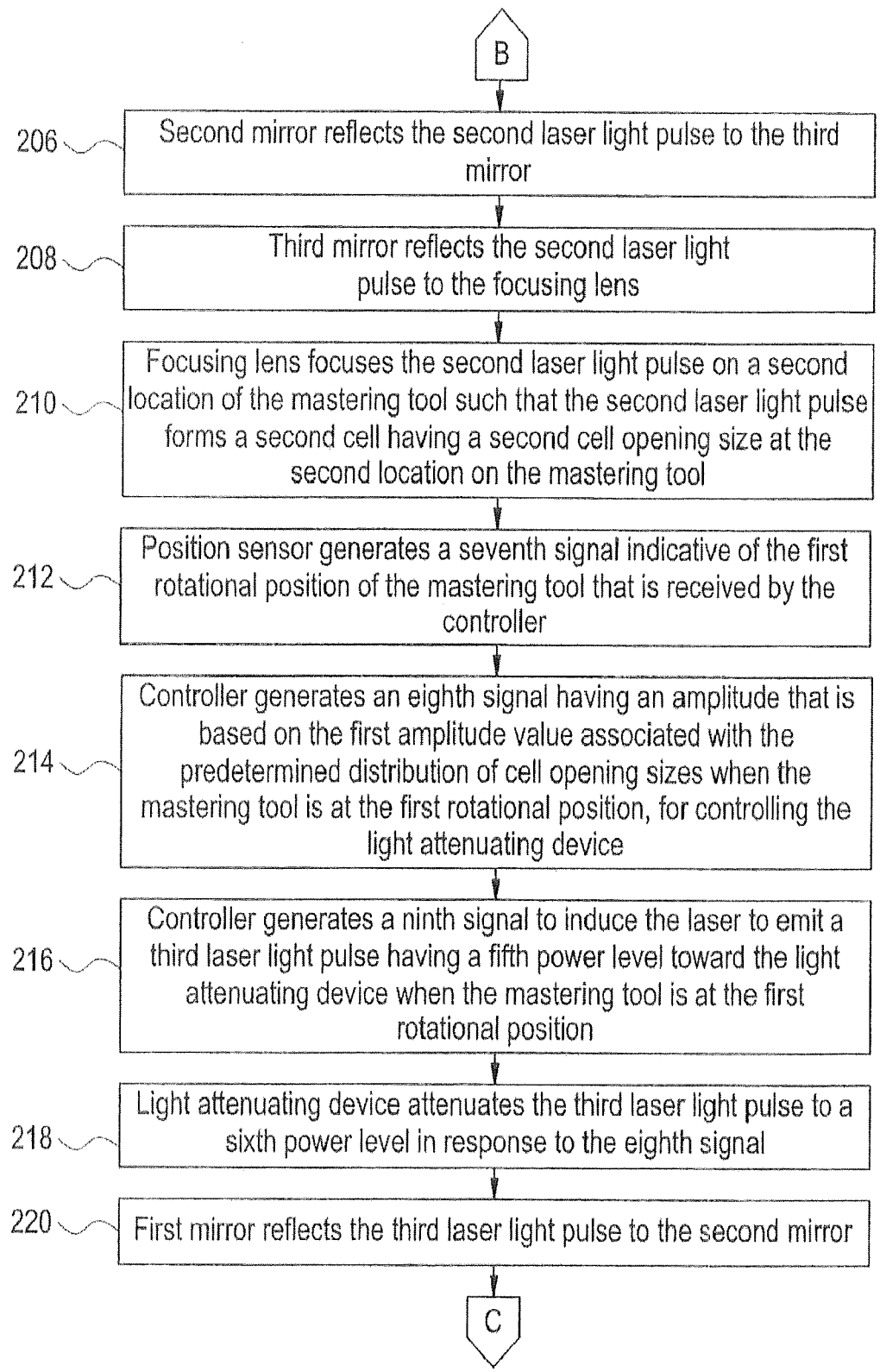
Figure 16:
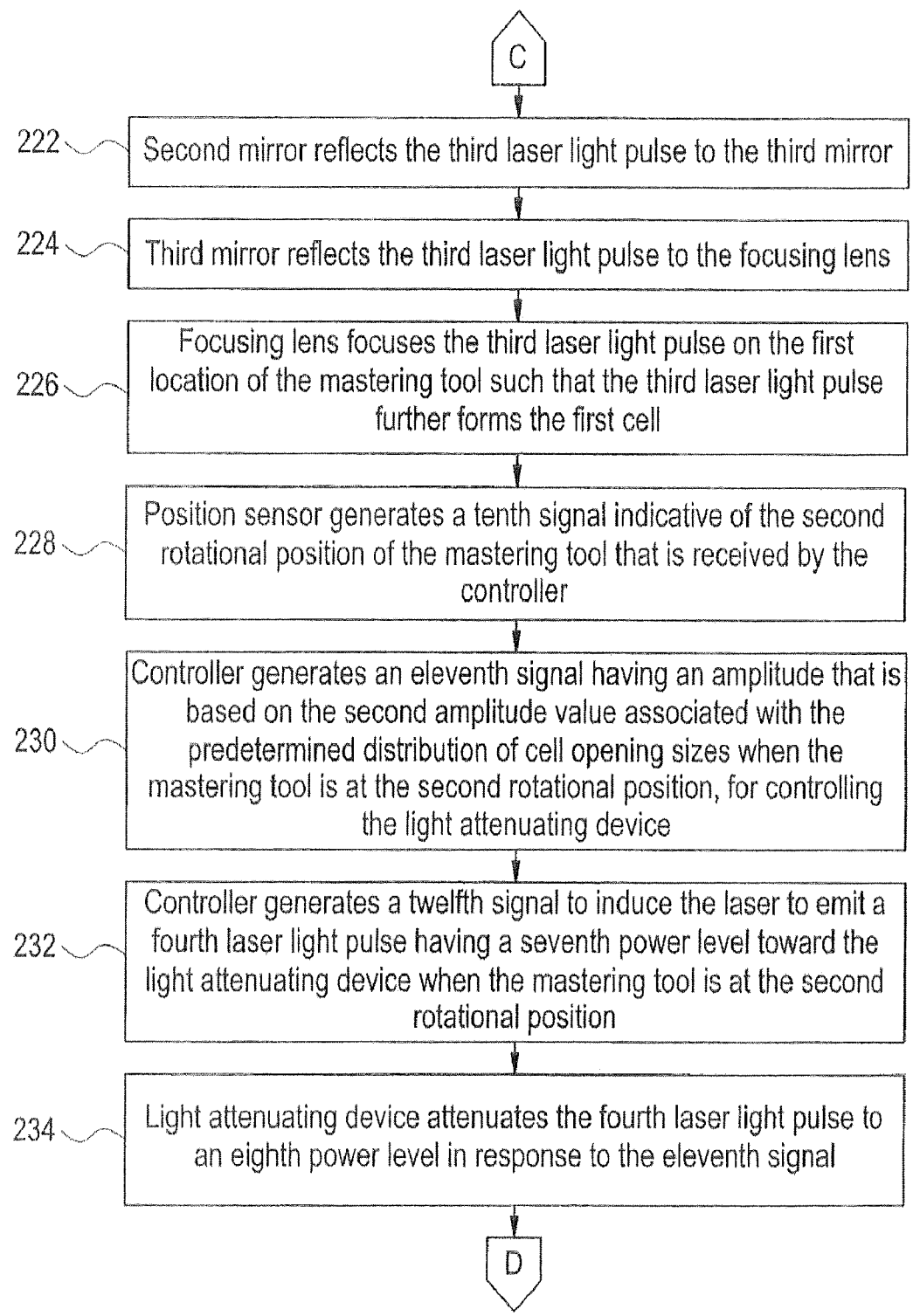
Figure 17:
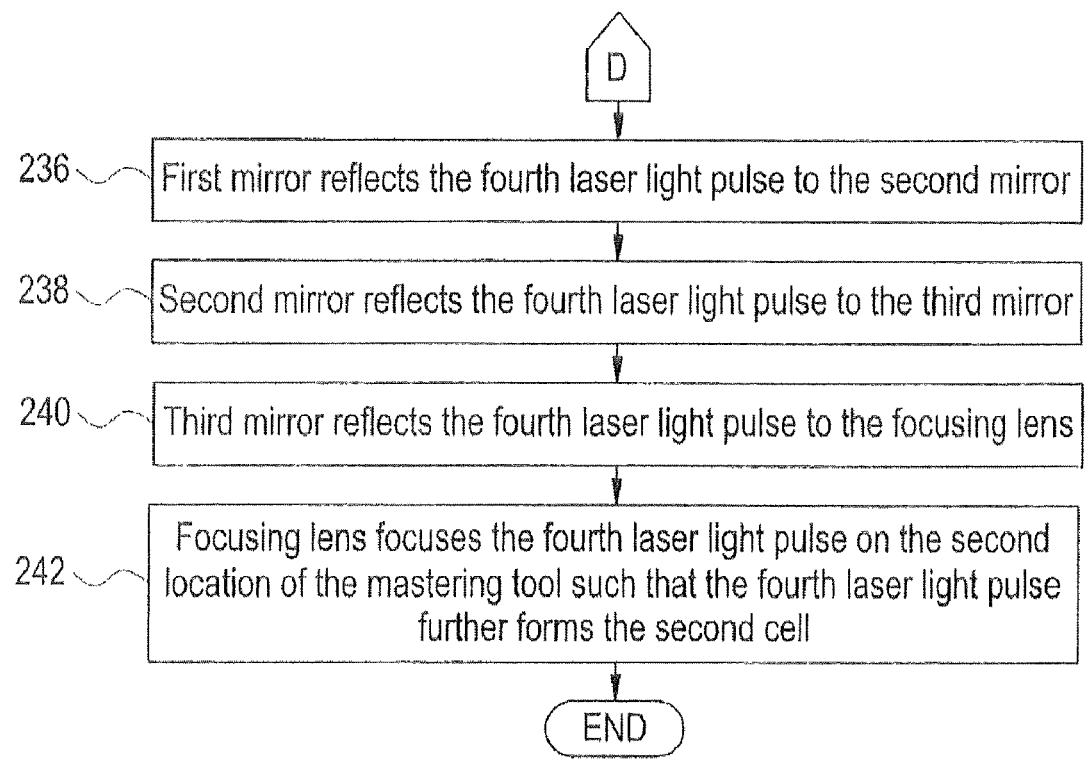

The focusing device 46 is provided to move the mirror 40 either inwardly or outwardly towards the mastering tool 24 to adjust a focal point of the laser light pulse relative to the mastering tool 24, based on a control signal from the controller 52. The focusing device 46 is physically coupled to both the carriage device 44 and the focusing lens 42 and is electrically coupled to the controller 52. Referring to FIGS. 7 and 8, during operation, the focusing device 46 can move the focusing lens to a first position (F1) such that the focusing lens 42 focuses a laser light pulse 130 to a focal point 132 that is at a predetermined optimal depth within the mastering tool 24. The laser light pulse 130 forms a cell 150 on the mastering tool 24 having a width (W1) and a depth (D1), wherein the aspect ratio is relatively high. Referring to FIGS. 9 and 10, further during operation, the focusing device 46 can move the focusing lens 42 to another position (F2) such that the focusing lens 42 focuses a laser light pulse 140 to a focal point 142 that is at another predetermined depth within the mastering tool 24. The laser light pulse 140 forms a cell 152 on the mastering tool 24 having a width (W2) and a depth (D2), wherein the width (W2) is greater than the width (W1), and the depth (D2) is less than the depth (D1).

Referring to FIG. 1, the carriage device 44 is provided to move the mirror 40, the focusing device 46, and the focusing lens 42 from the end 25 to the end 26 of the mastering tool 24, based on the control signal from the controller 52. It should be noted that during operation when the carriage device 44 is stopped at a position relative to the mastering tool 24, the mastering tool 24 can be rotated such that laser light pulses can form a plurality of cells around a circumference of the mastering tool 24, before the carriage device 44 moves to another position relative to the mastering tool 24. Of course, in an alternative embodiment, the formation of a plurality of cells around the mastering tool 24 is obtained by continuously stepping the carriage device 44 relative to the mastering tool 24. In the alternative embodiment, the plurality of cells would be formed along a helical path on the mastering tool 24 rather than a circumferential path on the mastering tool 24. The carriage device 44 is physically coupled to the mirror 40, the focusing device 46, and the focusing lens 42, and is electrically coupled to the controller 52.

It should be noted that in an alternative embodiment, the laser 72 and the light attenuating device 34 could be directly coupled to the carriage device 44. In this alternative embodiment, the laser 72 emits laser light pulses to the light attenuating device 34 which further directs the laser light pulses to the focusing lens 42. The focusing lens 42 directs the laser light pulses to the mastering tool 24 to form cells on the mastering tool 24.

The motor 48 is provided to rotate the mastering tool 24 about an axis 49 at a predetermined speed, in response to control signal from the controller 52. The motor 48 is physically coupled of the mastering tool 24 and electrically coupled to the controller 52.

The position sensor 50 is provided to generate a signal indicative of a rotational position of the mastering tool 24. The position sensor 50 is physically coupled to the mastering tool 24 and electrically coupled to the controller 52.

The controller 52 is provided to control operation of the components of the system 20 for forming a plurality of cells on the mastering tool 24. In particular, the controller 52 is configured to control operation of the laser 30, the carriage device 44, the focusing device 46, and the motor 48. Further, the controller 52 is configured to receive amplitude values from the signal generator 35 for controlling the light attenuating device 34 to vary a power level of emitted laser light pulses from the device 34. Further, the controller 52 is configured to receive position signals from the position sensor 50, which can be utilized to accurately position the cells at desired rotational positions on the mastering tool 24 at desired rotational positions. The controller 52 includes a central processing unit (CPU), a computer readable medium such as a read-only memory (ROM), a random access memory (RAM), and an input-output (I/O) interface (not shown). The CPU executes the software algorithms stored in the computer readable medium for implementing the control methodology described below with respect to system 20.

Figure 3:
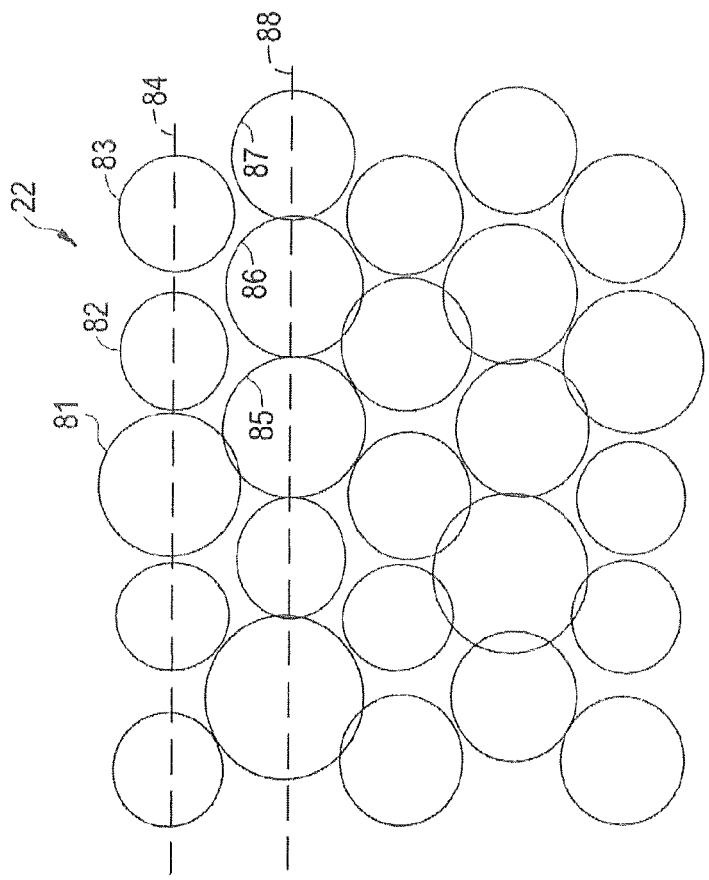
FIG. 3 is a schematic of a plurality of cells on a mastering tool having a hexagonal close packed pattern with cell geometry randomization.
Figure 2:
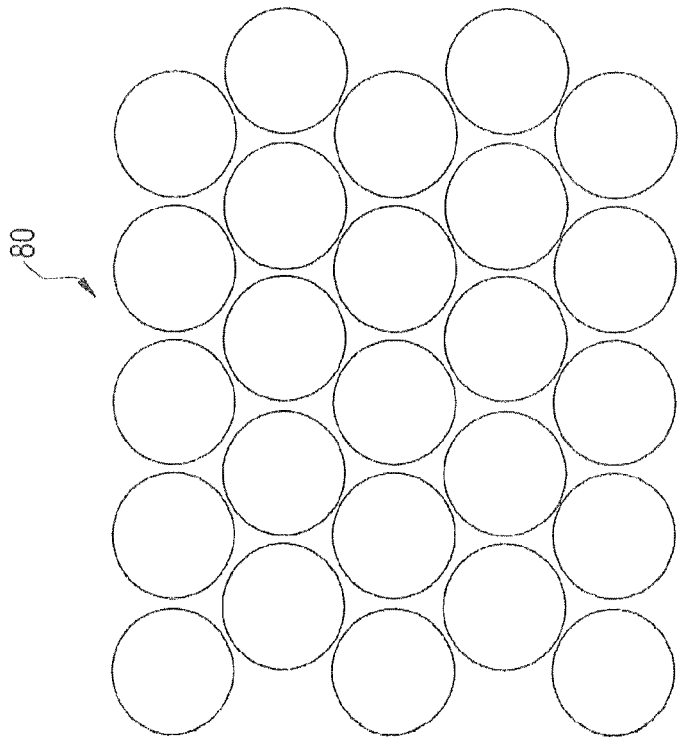
FIG. 2 is a schematic of a plurality of cells on a mastering tool having a hexagonal close packed pattern without cell geometry randomization.

Referring to FIG. 3, a brief explanation of a layout of a plurality of cells on a mastering tool with cell geometry randomization will be explained. Cell geometry randomization refers to the methodology of utilizing laser light pulses with varying power levels to generate cells having varying aspect ratios (e.g., varying cell opening sizes, varying cell depths, or both) in accordance with a predetermined distribution. As shown, the plurality of cells 82 on a mastering tool have varying cell opening sizes when cell geometry randomization is utilized. In particular, the cells 81, 82, 83 centered along line 84 have varying cell opening sizes. It should be noted that for purposes of simplicity, the line 84 is shown in a 2-D view. Further, the cells 85, 86, 87 centered along line 88 have varying cell opening sizes. In contrast, referring to FIG. 2, when cell geometry randomization is not utilized a plurality of cells 80 on a mastering tool can have substantially identical cell opening sizes. It should also be noted that the packing pattern of the cells can be varied according to a desired optical properties. For example, the packing pattern can be a square packing pattern, a face-centered-cubic packing pattern, a hexagonal packing pattern, or any combination of the foregoing packing patterns.

Figure 5:
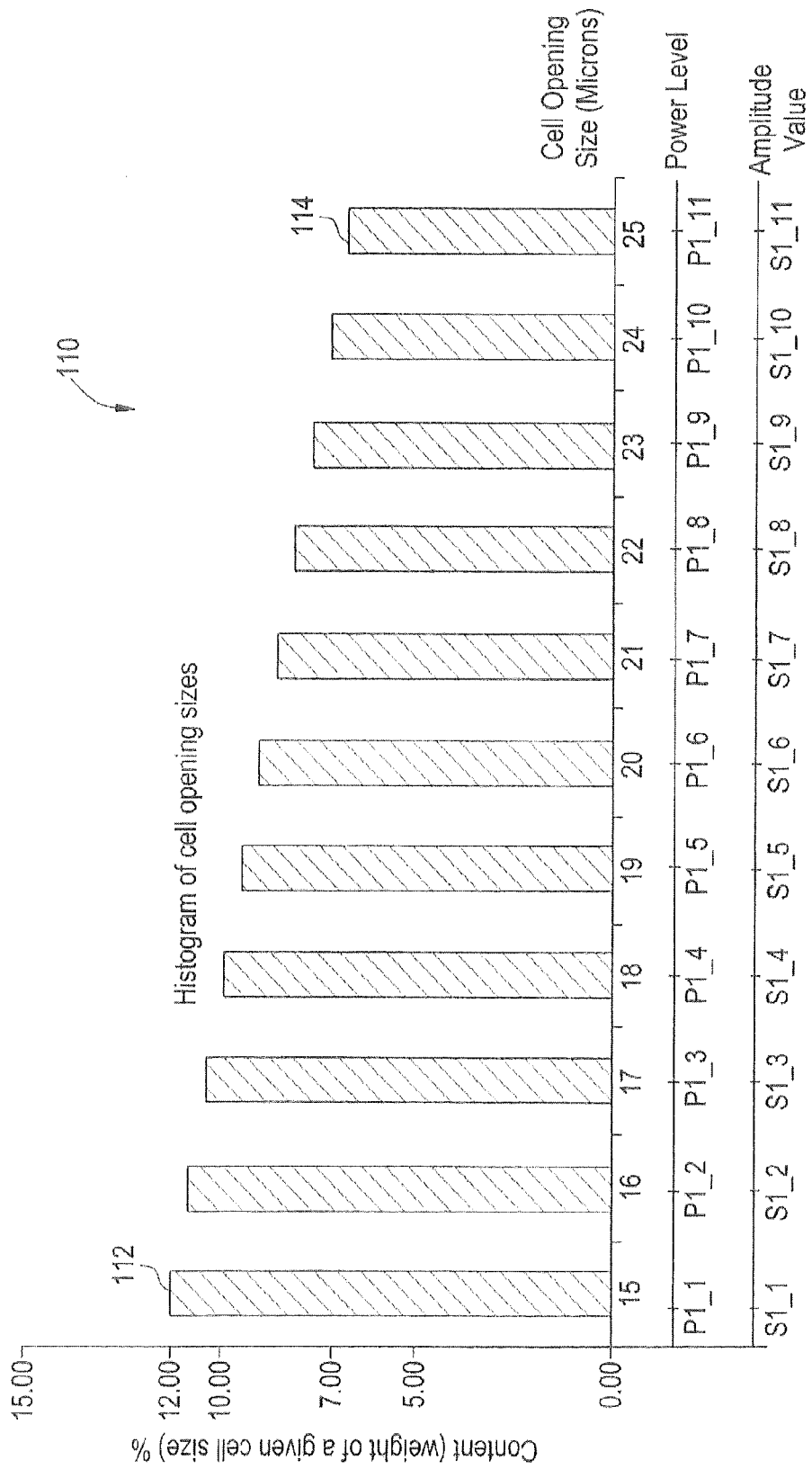
FIG. 5 is a graph illustrating an exemplary distribution of cell opening sizes of a plurality of cells formed on a mastering tool.

Referring to FIG. 5, a graph 110 illustrates an exemplary distribution of cell opening sizes on a mastering tool that can be obtained utilizing the system 20. In particular, the histogram bar 112 indicates that 12 percent of the cells on a mastering tool have a cell opening size of 15 microns. Further, the graph 110 illustrates that a laser light pulse having a power level (P1_1) is utilized to form each cell having a cell opening size of 15 microns. The graph 110 also indicates that an amplitude value (S1_1) is utilized to induce the light attenuating device 34 to output a laser light pulse having the power level (P1_1).

Further, in particular, a histogram bar 114 indicates that seven percent of the cells on the mastering tool have a cell opening size of 25 microns. Further, the graph 110 illustrates that a laser light pulse having power level (P1_11) is utilized to form each cell having a cell opening size of 25 microns. The graph 110 also indicates that an amplitude value (S1_11) is utilized to induce the light attenuating device 34 to output a laser light pulse having the power level (P1_11).

Figure 6:
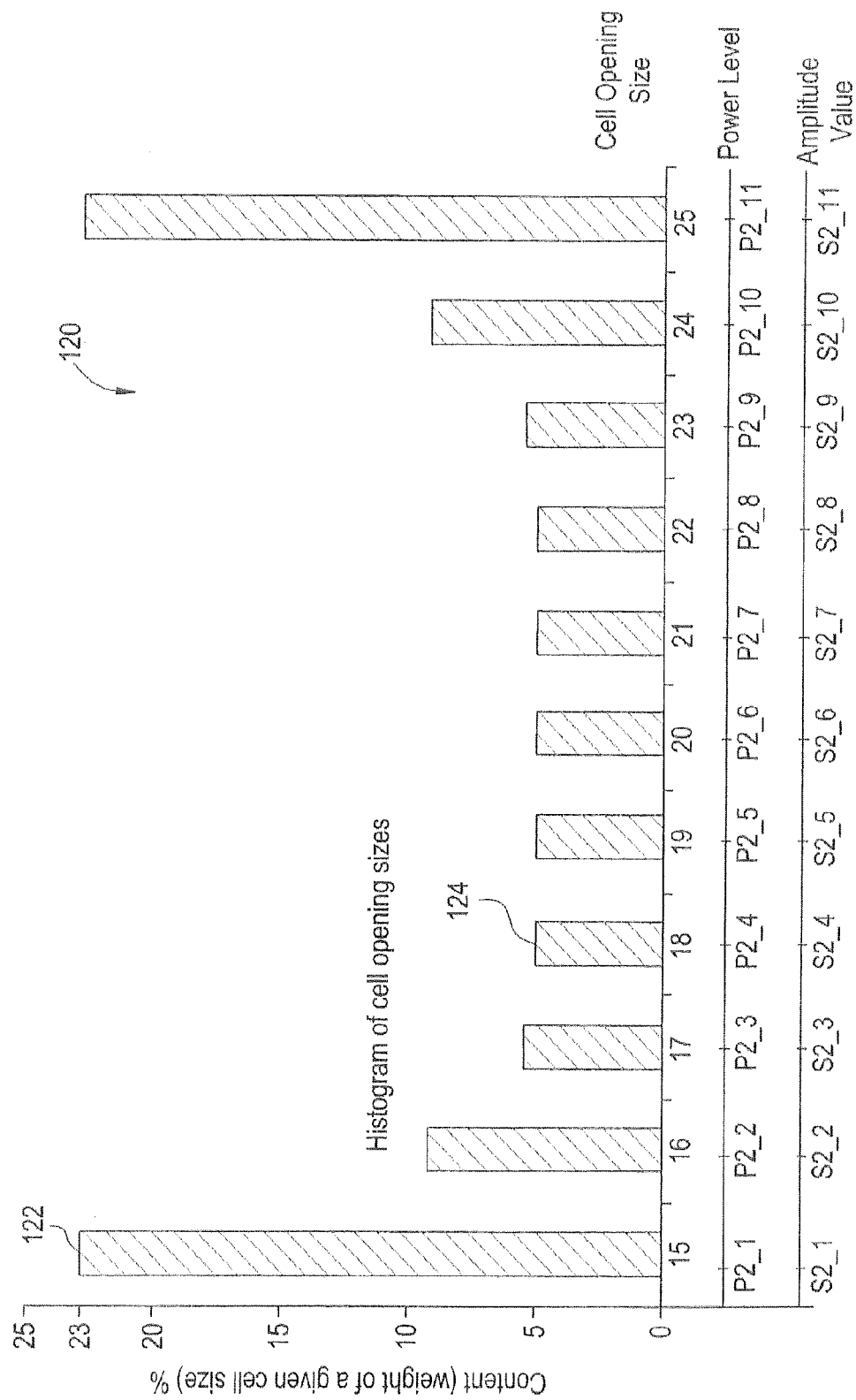
FIG. 6 is another graph illustrating another exemplary distribution of cell opening sizes of a plurality of cells formed on a mastering tool.

Referring to FIG. 6, a graph 120 illustrates another exemplary distribution of cell opening sizes on a mastering tool that can be obtained utilizing the system 20. In particular, the histogram bar 122 indicates that 23 percent of the cells on a mastering tool have a cell opening size of 15 microns. Further, the graph 120 illustrates that a laser light pulse having a power level (P2_1) is utilized to form each cell having a cell opening size of 15 microns. The graph 120 also indicates that an amplitude value (S2_1) is utilized to induce the light attenuating device 34 to output a laser light pulse having the power level (P2_1).

Further, in particular, a histogram bar 124 indicates that five percent of the cells on a mastering tool have a cell opening size of 18 microns. Further, the graph 120 illustrates that a laser light pulse having a power level (P2_4) is utilized to form each cell having a cell opening size of eighteen microns. The graph 120 also indicates that an amplitude value (S2_4) is utilized to induce the light attenuating device 34 to output a laser light pulse having the power level (P2_4).

Referring to FIG. 11, a table 160 illustrating empirically determined operational parameters associated with the system 20 for forming a plurality of cells on the mastering tool 24 is illustrated. Further, the operational parameters are associated with forming cells on a chrome surface of the mastering tool 24. Still further, the operational parameters were determined utilizing a YAG laser. In particular, the table 160 indicates that cells can be formed having a cell opening size in a range of 10-25 microns, with an aspect ratio in a range of 0-1.25, when the following operational parameters are utilized: (i) focal length of focusing lens 42 equals 40 millimeters, (ii) average power of laser light pulses reaching the mastering tool is 1-5 Watts, (iii) a laser light pulse length equals 6.1 microseconds, and (iv) a working range for a focal position on the mastering tool is ±30 microns. The working range represents a tolerance range for a distance between the focusing lens and a surface of the mastering tool (e.g., distance F1 in FIG. 7) that will retain cell uniformity and integrity.

The table 160 further indicates that a cell can be formed on the mastering tool 24 having a cell opening size in a range of 15-35 microns, with an aspect ratio in a range of 0-1.0, when the following operational parameters are utilized: (i) focal length of focusing lens 42 equals 50 millimeters, (ii) average power of a laser light pulses is 3-8 Watts, (iii) a laser light pulse direction equals 6.1 microseconds, and (iv) a working range for a focal position on the mastering tool is ±60 microns.

The table 160 further indicates that a cell can be formed having a cell opening size in a range of 25-50 microns, with an aspect ratio in a range of 0-0.9, when the following operational parameters are utilized: (i) focal length of focusing lens 42 equals 80 millimeters, (ii) average power of laser light pulses is 6-10 Watts, (iii) a laser light pulse duration equals 6.1 microseconds, and (iv) a working range for a focal position on the mastering tool is ±100 microns.

The table 160 further indicates that a cell can be formed having a cell opening size in a range of 50-100 microns, with an aspect ratio in a range of 0-0.5, when the following operational parameters are utilized: (i) focal length of focusing lens 42 equals 80 millimeters, (ii) average power of laser light pulses is 10-20 Watts with multiple pulses forming the cell, (iii) a laser light pulse duration equals 8.3 microseconds, and (iv) a working range for a focal position on the mastering tool is ±100 microns.

Referring to FIG. 12, a table 170 illustrating empirically determined operational parameters associated with the system 20 for forming a plurality of cells on a ceramic mastering tool is illustrated. Still further, the operational parameters were determined utilizing a Ytterbium fiber laser instead of laser 30. In particular, the table 170 indicates that cells can be formed having a cell opening size in a range of 10-25 microns, with an aspect ratio in a range of 0-1.25, when the following operational parameters are utilized: (i) focal length of focusing lens 42 equals 40 millimeters, (ii) average power of laser light pulses is 1-15 Watts, (iii) a laser light pulse duration equals 2.8 microseconds, and (iv) a working range for a focal position on the mastering tool is ±30 microns.

The table 170 further indicates that a cell can be formed having a cell opening size in a range of 15-35 microns, with an aspect ratio in a range of 0-1.0, when the following operational parameters are utilized: (i) focal length of focusing lens 42 equals 50 millimeters, (ii) average laser power is 5-25 Watts, (iii) a laser light pulse duration equals 3.3 microseconds, and (iv) a working range for a focal position on the mastering tool is ±60 microns.

The table 170 further indicates that a cell can be formed having a cell size opening in a range of 25-50 microns, with an aspect ratio in a range of 0-0.9, when the following operational parameters are utilized: (i) focal length of focusing lens 42 equals 80 millimeters, (ii) average power of laser light pulses is 15-50 Watts, (iii) a laser light pulse duration equals 3.7 microseconds, and (iv) a working range for a focal position on the mastering tool is ±100 microns.

The table 170 further indicates that a cell can be formed having a cell opening size in a range of 50-100 microns, with an aspect ratio in a range of 0-0.5, when the following operational parameters are utilized: (i) focal length of focusing lens 42 equals 80 millimeters, (ii) average power of laser light pulses is 50-100 Watts with multiple pulses forming the cell, (iii) a laser light pulse duration equals 3.7 microseconds, and (iv) a working range for a focal position on the mastering tool is ±100 microns.

Referring to FIGS. 13-17, a method for forming a plurality of cells on the mastering tool 24 utilizing the system 20 will now be explained. In particular, for purposes of simplicity, the method will describe the steps for forming first and second cells on the mastering tool 24 utilizing the system 20. It should be noted that steps 180-210 describe utilizing a single laser light pulse for forming each respective cell on the mastering tool 24. Still further, the steps 212-242 are optional steps that would only be utilized when additional laser light pulses are utilized for forming the first and second cells on the mastering tool 24. Still further, it should be noted, that when the system 20 forms a textured surface on the mastering tool 24, the system 20 would form a plurality of additional cells in the mastering tool 24 utilizing steps similar to those described below.

At step 180, the controller 52 induces the motor 48 to rotate the mastering tool 24.

At step 181, the position sensor 50 generates a first signal indicative of a first rotational position of the mastering tool 24 that is received by the controller 52.

At step 182, the controller 52 generates a second signal having an amplitude that is based on a first amplitude value when the mastering tool 24 is at the first rotational position. The first amplitude value is one of a plurality of amplitude values associated with a predetermined distribution of cell opening sizes within a range of cell opening sizes for the mastering tool 24.

At step 184, the controller 52 generates a third signal to induce the laser 30 to emit a first laser light pulse having a first power level toward the light attenuating device 34 when the mastering tool 24 is at the first rotational position.

At step 186, the light attenuating device 34 attenuates the first laser light pulse to a second power level in response to the second signal.

At step 188, the mirror 36 reflects the first laser light pulse to the mirror 38.

At step 190, the mirror 38 reflects the first laser light pulse to the mirror 40.

At step 192, the mirror 40 reflects the first laser light pulse to the focusing lens 42.

At step 194, the focusing lens 42 focuses the first laser light pulse on a first location of the mastering tool 24 such that the first laser light pulse forms a first cell having a first cell opening size at the first location on the mastering tool 24.

At step 196, the position sensor 50 generates a fourth signal indicative of a second rotational position of the mastering tool 24 that is received by the controller 52.

At step 198, the controller 52 generates a fifth signal having an amplitude that is based on a second amplitude value for controlling the light attenuating device 34 when the mastering tool 24 is at the second rotational position. The second amplitude value is one of the plurality of amplitude values associated with the predetermined distribution of cell opening sizes.

At step 200, the controller 52 generates a sixth signal to induce the laser 30 to emit a second laser light pulse having a third power level toward the light attenuating device 34 when the mastering tool 24 is at the second rotational position.

At step 202, the light attenuating device 34 attenuates the second laser light pulse to a fourth power level in response to the fifth signal.

At step 204, the mirror 36 reflects the second laser light pulse to the mirror 38.

At step 206, the mirror 38 reflects the second laser light pulse to the mirror 40.

At step 208, the mirror 40 reflects the second laser light pulse to the focusing lens 42.

At step 210, the focusing lens 42 focuses the second laser light pulse on a second location of the mastering tool 24 such that the second laser light pulse forms a second cell having a second cell opening size at the second location on the mastering tool 24.

At step 212, the position sensor 50 generates a seventh signal indicative of the first rotational position of the mastering tool 24 that is received by the controller 52.

At step 214, the controller 52 generates an eighth signal having an amplitude that is based on the first amplitude value associated with the predetermined distribution of cell opening sizes when the mastering tool 24 is at the first rotational position, for controlling the light attenuating device 34.

At step 216, the controller 52 generates a ninth signal to induce the laser 30 to emit a third laser light pulse having a fifth power level toward the light attenuating device 34 when the mastering tool 24 is at the first rotational position.

At step 218, the light attenuating device 34 attenuates the third laser light pulse to a sixth power level in response to the eighth signal.

At step 220, the mirror 36 reflects the third laser light pulse to the mirror 38.

At step 222, the mirror 38 reflects the third laser light pulse to the mirror 40.

At step 224, the mirror 40 reflects the third laser light pulse to the focusing lens 42.

At step 226, the focusing lens 42 focuses the third laser light pulse on the first location of the mastering tool 24 such that the third laser light pulse further forms the first cell.

At step 228, the position sensor 50 generates a tenth signal indicative of the second rotational position of the mastering tool 24 that is received by the controller 52.

At step 230, the controller 52 generates an eleventh signal having an amplitude that is based on the second amplitude value associated with the predetermined distribution of cell opening sizes when the mastering tool 24 is at the second rotational position, for controlling the light attenuating device 34.

At step 232, the controller 52 generates a twelfth signal to induce the laser 30 to emit a fourth laser light pulse having a seventh power level toward the light attenuating device 34 when the mastering tool 24 is at the second rotational position.

At step 234, the light attenuating device 34 attenuates the fourth laser light pulse to an eighth power level in response to the eleventh signal.

At step 236, the mirror 36 reflects the fourth laser light pulse to the mirror 38.

At step 238, the mirror 38 reflects the fourth laser light pulse to the mirror 40.

At step 240, the mirror 40 reflects the fourth laser light pulse to the focusing lens 42.

At step 242, the focusing lens 42 focuses the fourth laser light pulse on the second location of the mastering tool 24 such that the fourth laser light pulse further forms the second cell. After step 242, the method is exited.

Figure 18:
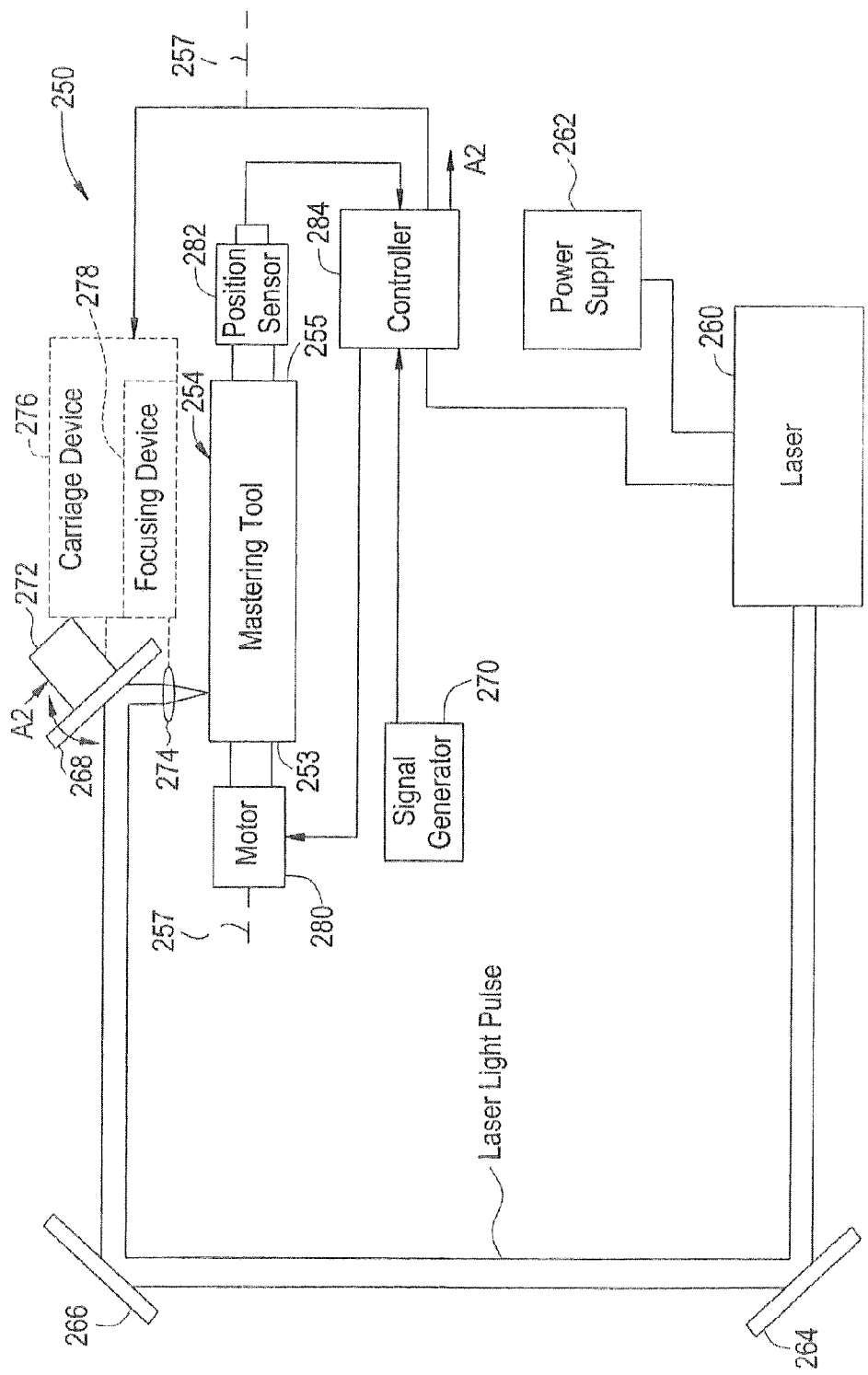
FIG. 18 is a schematic of a system for forming a plurality of cells on a mastering tool utilizing cell placement randomization in accordance with another exemplary embodiment.

Referring to FIG. 18, a system 250 for forming a plurality of cells on a mastering tool 254 is provided. An advantage of the system 250 is that the system 250 utilizes a cell placement randomization methodology to vary a placement of the cells relative to circumferential lines on the mastering tool by varying a position of laser light pulses contacting the mastering tool with respect to the circumferential lines. As a result, the mastering tool 254 has a textured surface that can form a textured film that does not have undesirable banding and patterns discussed above. The system 250 includes a laser 260, a power supply 262, mirrors 264, 266, 268, a signal generator 270, an actuator 272, a focusing lens 274, a carriage device 276, a focusing device 278, a motor 280, a position sensor 282, and the controller 284.

The laser 260 is provided to generate a plurality of laser light pulses that are used to form a plurality of cells on the mastering tool 254. In the illustrated exemplary embodiment, the laser 260 comprises a single mode Q-switched YAG laser having a substantially similar structure as laser 30. It should be noted that in alternative embodiments, the laser 260 comprises any known laser capable of forming cells on a mastering tool. For example, in an alternative embodiment the laser 260 can comprise a single mode continuous-mode Ytterbium fiber laser. The laser 260 is controlled via the control signal from the controller 284. Further, the laser 260 receives electrical power from the power supply 262.

The mirror 264 is provided to receive laser light pulses from the laser 260 and to reflect the laser light pulses to the mirror 266. In the illustrated embodiment, the mirror 266 is a stationary mirror. However, in an alternative embodiment, the mirror 266 is configured as a moveable mirror whose position can be changed based on a control signal from the controller 284, to vary a direction of reflected laser light pulses toward the mirror 266.

The mirror 266 is provided to receive laser light pulses from the mirror 264 and to reflect the laser light pulses to the mirror 268. In the illustrated embodiment, the mirror 266 is a stationary mirror. However, in an alternative embodiment, the mirror 266 is configured as a moveable mirror whose position can be changed based on a control signal from the controller 284, to vary a direction of reflected laser light pulses toward the mirror 268.

The mirror 268 is provided to receive laser light pulses from the mirror 266 and to reflect the laser light pulses to the focusing lens 274. The mirror 268 is coupled to the carriage device 276 that moves the mirror 268 generally parallel to the mastering tool 254 from an end 253 to an end 255 of the mastering tool 254. The actuator 272 is operable a coupled to the mirror 268 and is provided to rotate the mirror 268 to desired operational positions, based upon control signals from the controller 284.

The signal generator 270 is provided to generate a plurality of amplitude values that are received by the controller 284 and subsequently utilized by the controller 284 to generate control signals to induce the actuator 272 to move the mirror 268 to desired operational positions to form the plurality of cells at desired locations on the mastering tool 254. It should be noted that by varying the operational position of the mirror 268, the placement of the plurality of cells on the mastering tool 254 can be varied.

The focusing lens 274 is provided to receive a plurality of laser light pulses from the mirror 268 and to focus each of the laser light pulses. In one exemplary embodiment, the focusing lens 274 has a focal length of 40 millimeters. In alternative embodiments, the focusing lens 274 has a focal length of 50 millimeters and 80 millimeters. Of course, the focusing lens 274 can have focal lengths between 40-80 millimeters, or less than 40 millimeters, or greater than 80 millimeters.

The focusing device 278 is provided to move the mirror 268 either upwardly or downwardly towards the mastering tool 254 to adjust a focal point of the laser light pulse relative to the mastering tool 254, based on a control signal from the controller 284. The focusing device 278 is physically coupled to both the carriage device 276 and the focusing lens 274 and is electrically coupled to the controller 284.

The carriage device 276 is provided to move the mirror 268, the focusing device 278, and the focusing lens 274 from the end 253 to the end 255 of the mastering tool 254, based on the control signal from the controller 284. It should be noted that during operation when the carriage device 276 is stopped at an axial position relative to the mastering tool 254, the mastering tool 254 can be rotated such that the laser light pulses can form a plurality of cells around a circumference of the mastering tool 254, before the carriage device 276 moves to another position relative to the mastering tool 254. The carriage device 276 is physically coupled to the mirror 268, the focusing device 278, and the focusing lens 274, and is electrically coupled to the controller 284.

It should be noted that in an alternative embodiment, the laser 260 is directly coupled to the carriage device 276. In this alternative embodiment, the laser 276 emits laser light pulses to the mirror 268 that directs the laser light pulses to the focusing lens 274. The focusing lens 274 directs the laser light pulses to the mastering tool 254 to form cells on the mastering tool 254.

The motor 280 is provided to rotate the mastering tool 254 about an axis 257 at a predetermined speed, in response to control signal from the controller 284. The motor 284 is physically coupled of the mastering tool 254 and electrically coupled to the controller 284.

The position sensor 282 is provided to generate a signal indicative of a rotational position of the mastering tool 254. The position sensor 282 is physically coupled to the mastering tool 254 and electrically coupled to the controller 284.

The controller 284 is provided to control operation of the components of the system 250 for forming a plurality of cells on the mastering tool 254. In particular, the controller 284 is configured to control operation of the laser 260, the carriage device 276, the focusing device 278, and the motor 280. Further, the controller 284 is configured to receive amplitude values from the signal generator 270 and to generate control signals for inducing the actuator 272 to move the mirror 268 to desired operational positions. By varying the amplitude values, the position of the mirror 262 is varied such that the placement of the placement of a plurality of cells on the mastering tool 254 is varied. Further, the controller 284 is configured to receive position signals from the position sensor 282, which can be utilized to accurately position the mastering tool 254 at desired rotational positions. The controller 284 includes a CPU, a computer readable medium such as a ROM and a RAM, and an I/O interface (not shown). The CPU executes the software algorithms stored in the computer readable medium for implementing the control methodology described below with respect to system 250.

It should be noted that although the system 250 adjusts an operational position of the mirror 268 to vary the placement of the cells on the mastering tool 254, that in alternative embodiments any optical device (e.g., laser 260, mirrors 264, 266, or focusing lens 274) within the system 250 could have its operational position adjusted utilizing one or more actuators (not shown) to vary the placement of the cells on the mastering tool 254.

It should be noted in an alternative embodiment, a stationary device (not shown is placed in the optical path of the laser light pulses and optically steers the laser light pulses to vary the placement of the cells on the mastering tool 254, instead of utilizing a movable optical component (e.g., a movable mirror). An example of such a stationary device is an Acousto-Optical Modulator (AOM) that diffracts received laser light pulses in certain directions. In particular, the AOM receives laser light pulses and controls the mode and the direction of diffraction of the laser light pulses based on a high frequency electrical signal received by the AOM.

Figure 19:
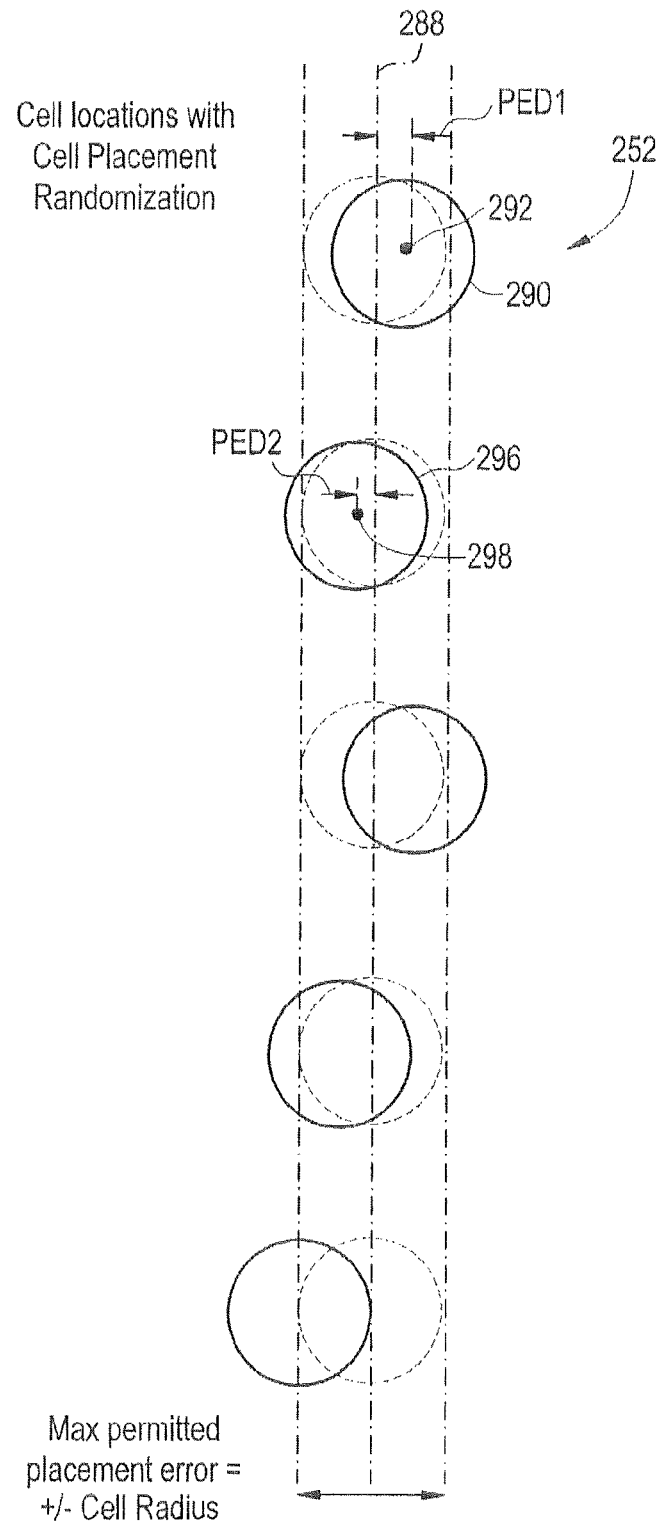
FIG. 19 is a schematic of a plurality of cells on a mastering tool having cell placement randomization.

Referring to FIG. 19, a brief explanation of a plurality of cells on a mastering tool with cell placement randomization will be explained. Cell placement randomization refers to a methodology of varying a position of laser light pulses contacting the mastering tool to generate cells at varying position error distances with respect to circumferential lines on the mastering tool 254 in accordance with a predetermined distribution. As shown, the plurality of cells 252 are disposed on a mastering tool proximate a circumferential line 288 extending around the mastering tool. It should be noted that for purposes of simplicity, the circumferential line 288 is shown in a 2-D view. Further, the center points of each of the cells in the plurality of cells 252 are disposed at predetermined position error distances from the circumferential line 288. For example, the center point 292 of the cell 290 is disposed at a position error distance (PED1) from the circumferential line 288. Further, for example, the center point 298 of the cell 296 is disposed at a position error distance (PED2) from the circumferential line 296.

Figure 20:
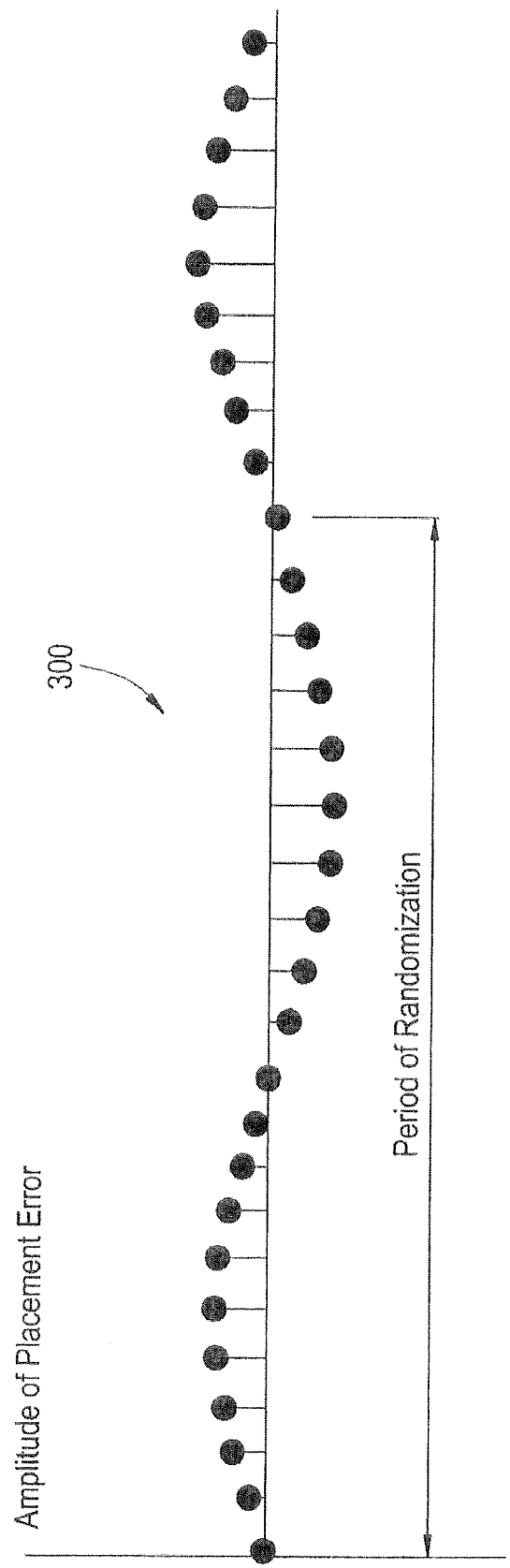
FIG. 20 is a schematic of a plurality of amplitude values utilized by the system of FIG. 18 to form a plurality of cells on a mastering tool.

Referring to FIG. 20, a plurality of the amplitude values 300 that can be generated by signal generator 270 is illustrated. Each amplitude value of the plurality in amplitude values 320 corresponds to a position error value for a cell with respect to a predetermined circumferential line.

Figure 21:
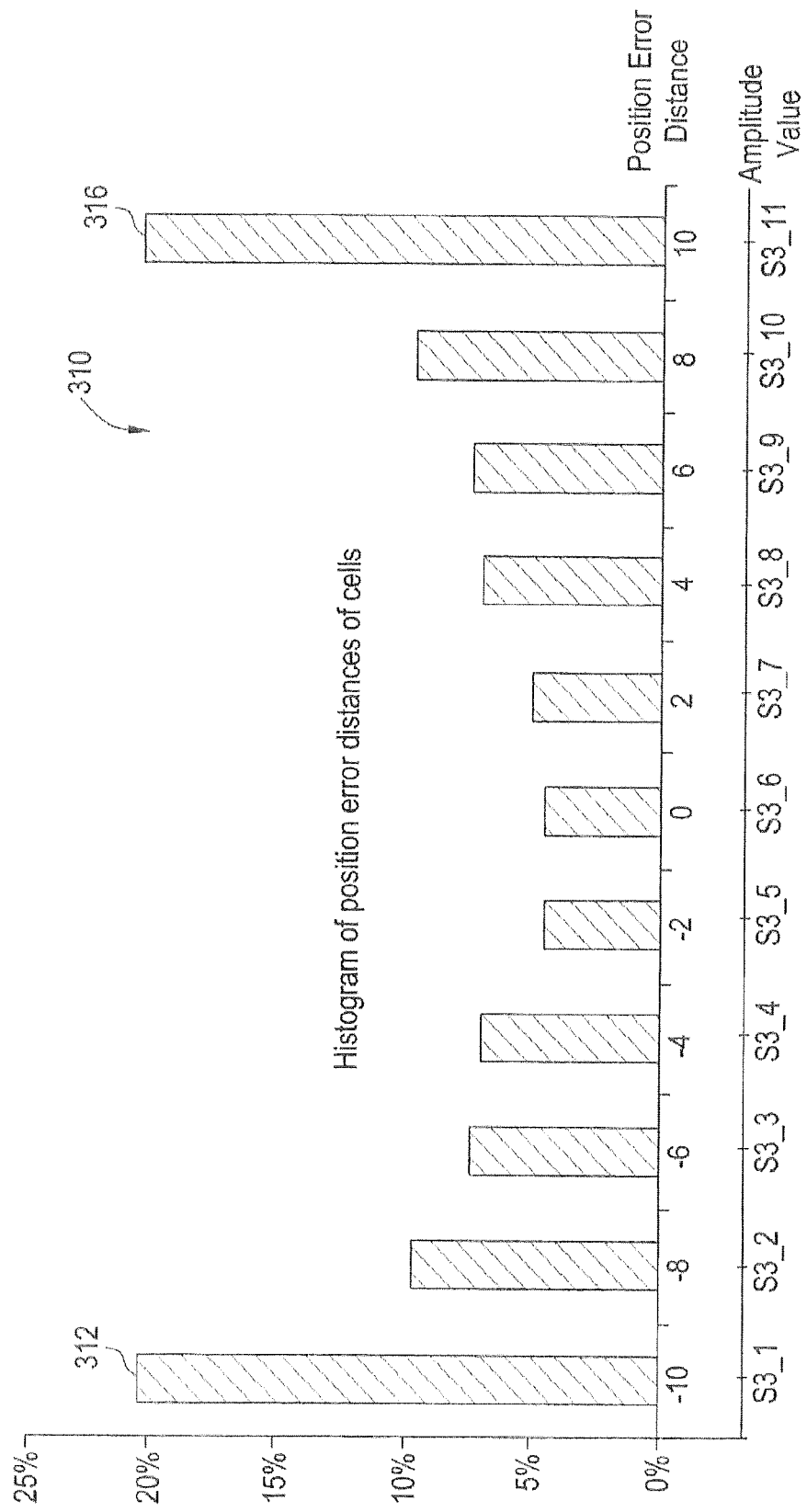
FIG. 21 is a graph illustrating an exemplary distribution of cell placement errors of a plurality of cells formed on a mastering tool utilizing the plurality of amplitude values of FIG. 20.

Referring to FIG. 21, a graph 310 illustrates an exemplary distribution of cell position errors for cells relative to circumferential lines of a mastering tool that can be obtained utilizing the plurality of the amplitude values 300. In particular, the histogram bar 312 indicates that 20 percent of the cells along a circumferential line of the mastering tool has a position error distance of −10 microns. Further, the graph 310 indicates that an amplitude value (S3_1) is utilized to induce the actuator 272 to move the mirror 268 such that a laser light pulse reflected therefrom forms a cell with a position error distance of −10 microns from a respective circumferential line. Still further, the histogram bar 316 indicates that 20 percent of the cells along the circumferential line of the mastering tool have a position error distance of 10 microns. Further, the graph 310 indicates that an amplitude value (S3_11) is utilized to induce the actuator 272 to move the mirror 268 such that a laser light pulse reflected therefrom forms a cell with a position error distance of 10 microns from the respective circumferential line.

Figure 22:
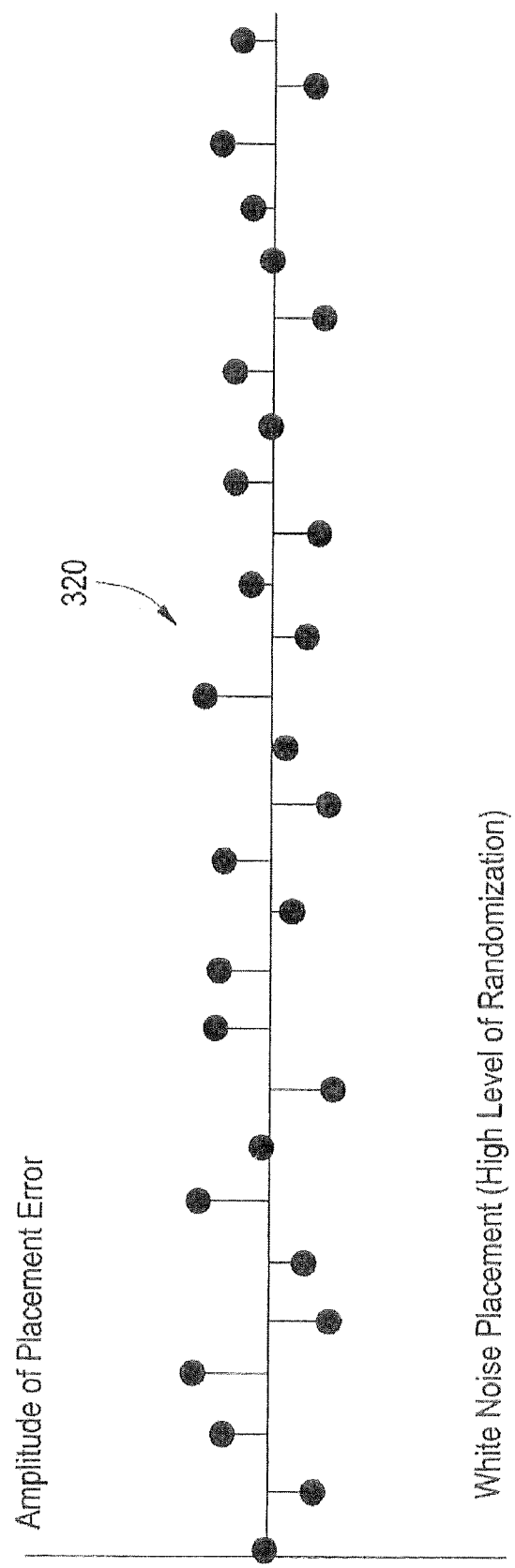
FIG. 22 is a schematic of another plurality of amplitude values utilized by the system of FIG. 18 to form a plurality of cells on a mastering tool.

Referring to FIG. 22, a plurality of the amplitude values 320 that can be generated by signal generator 270 is illustrated. Each amplitude value of the plurality in amplitude values 300 corresponds to a position error value for a cell with respect to a predetermined circumferential line.

Figure 23:
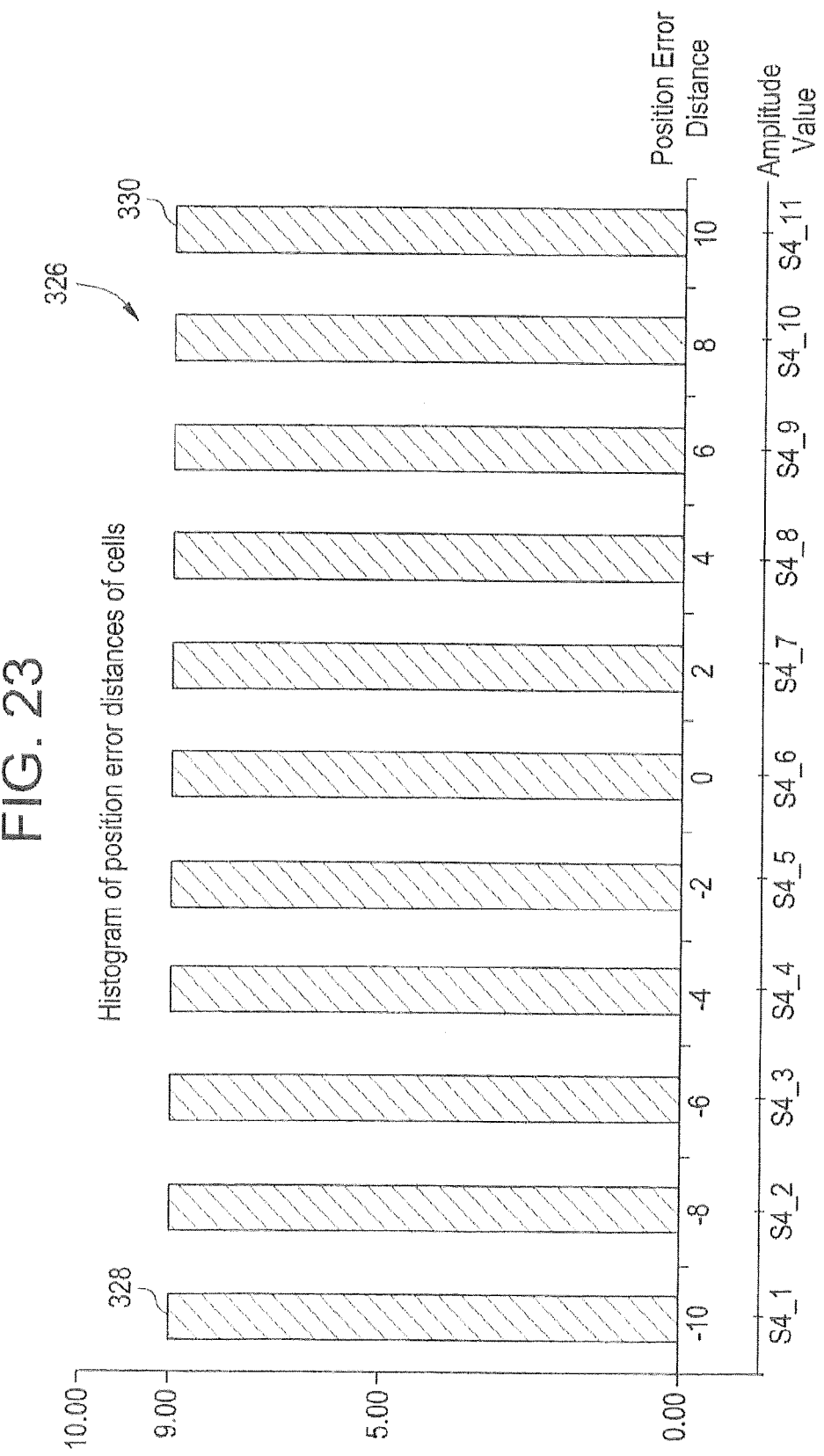
FIG. 23 is a graph illustrating another exemplary distribution of cell placement errors of a plurality of cells formed on a mastering tool utilizing the plurality of amplitude values of FIG. 22.

Referring to FIG. 23, a graph 326 illustrates an exemplary distribution of cell position errors for cells (having a 20 micron cell opening size) relative to circumferential lines of a mastering tool that can be obtained utilizing the plurality of amplitude values 320. In particular, the histogram bar 328 indicates that 9 percent of the cells along a circumferential line of the mastering tool has a position error distance of −10 microns. Further, the graph 326 indicates that an amplitude value (S4_1) is utilized to induce the actuator 272 to move the mirror 268 such that a laser light pulse reflected therefrom forms a cell with a position error distance of −10 microns from the respective circumferential line. Further, the graph 326 indicates that an amplitude value (S4_11) is utilized to induce the actuator 272 to move the mirror 268 such that a laser light pulse reflected therefrom forms a cell with a position error distance of 10 microns from the respective circumferential line.

Figure 24:
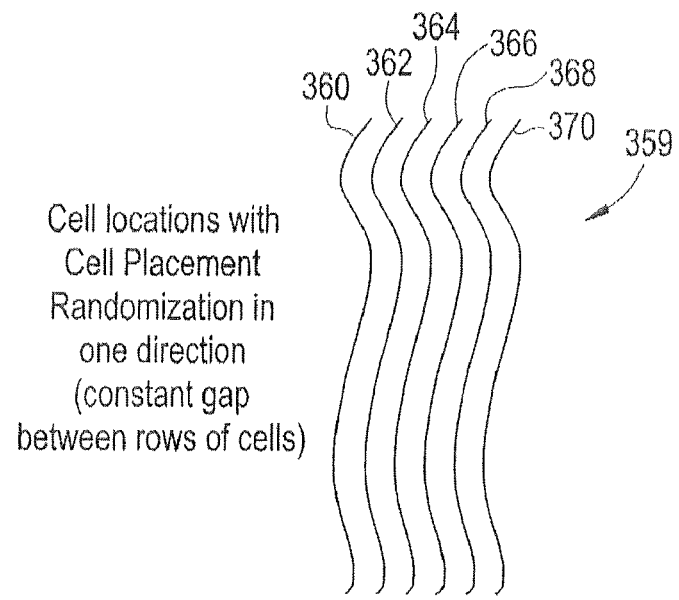
FIG. 24 illustrates an exemplary plurality of placement lines on which center points of a plurality of cells are disposed on a mastering tool.

Referring to FIG. 24, a plurality of lines 359 for illustrating an exemplary positioning of center points of cells on the mastering tool 254 utilizing a cell placement randomization methodology are provided. Although the plurality of lines 359 extend around the mastering tool 254, the lines 359 are illustrated in a 2-D view for purposes of discussion. Each line of lines 359 is equidistant from adjacent lines. It should be further noted that each line of lines 359 extends through center points (not shown) of cells that are disposed intermittently around the mastering tool 254. For example, the line 360 extends through center points of cells that extend around the mastering tool 254 that are formed when the carriage device 276 is disposed at a first axial position relative to the mastering tool 254 and the mastering tool 254 is rotated 360 degrees. Further, for example, the line 362 extends through center points of cells that extend around the mastering tool 254 that are formed when the carriage device 276 is disposed at a second axial position relative to the mastering tool 254 and the mastering tool 254 is rotated 360 degrees. Further, for example, the line 364 extends through center points of cells that extend around the mastering tool 254 that are formed when the carriage device 276 is disposed at a third axial position relative to the mastering tool 254 and the mastering tool 254 is rotated 360 degrees. Further, for example, the line 366 extends through center points of cells that extend around the mastering tool 254 that are formed when the carriage device 276 is disposed at a fourth axial position relative to the mastering tool 253 and the mastering tool 254 is rotated 360 degrees.

Figure 25:
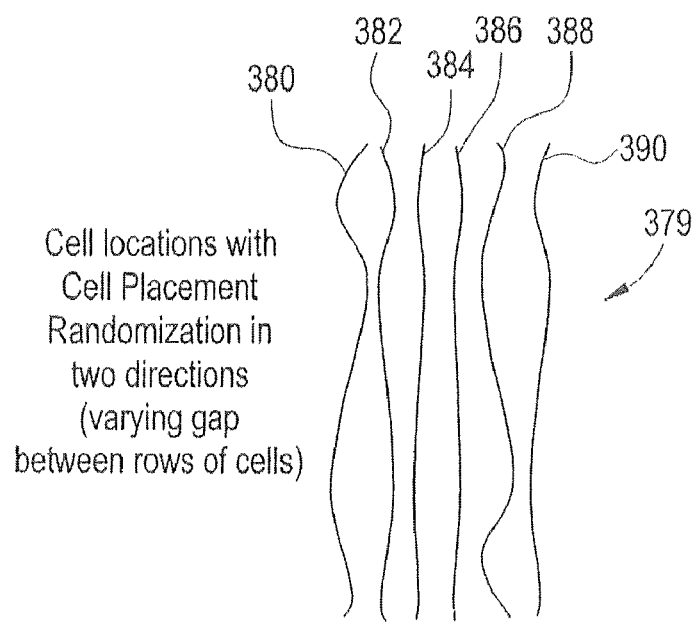
FIG. 25 illustrates another exemplary plurality of placement lines on which center points of a plurality of cells are disposed on a mastering tool.
Figure 26:
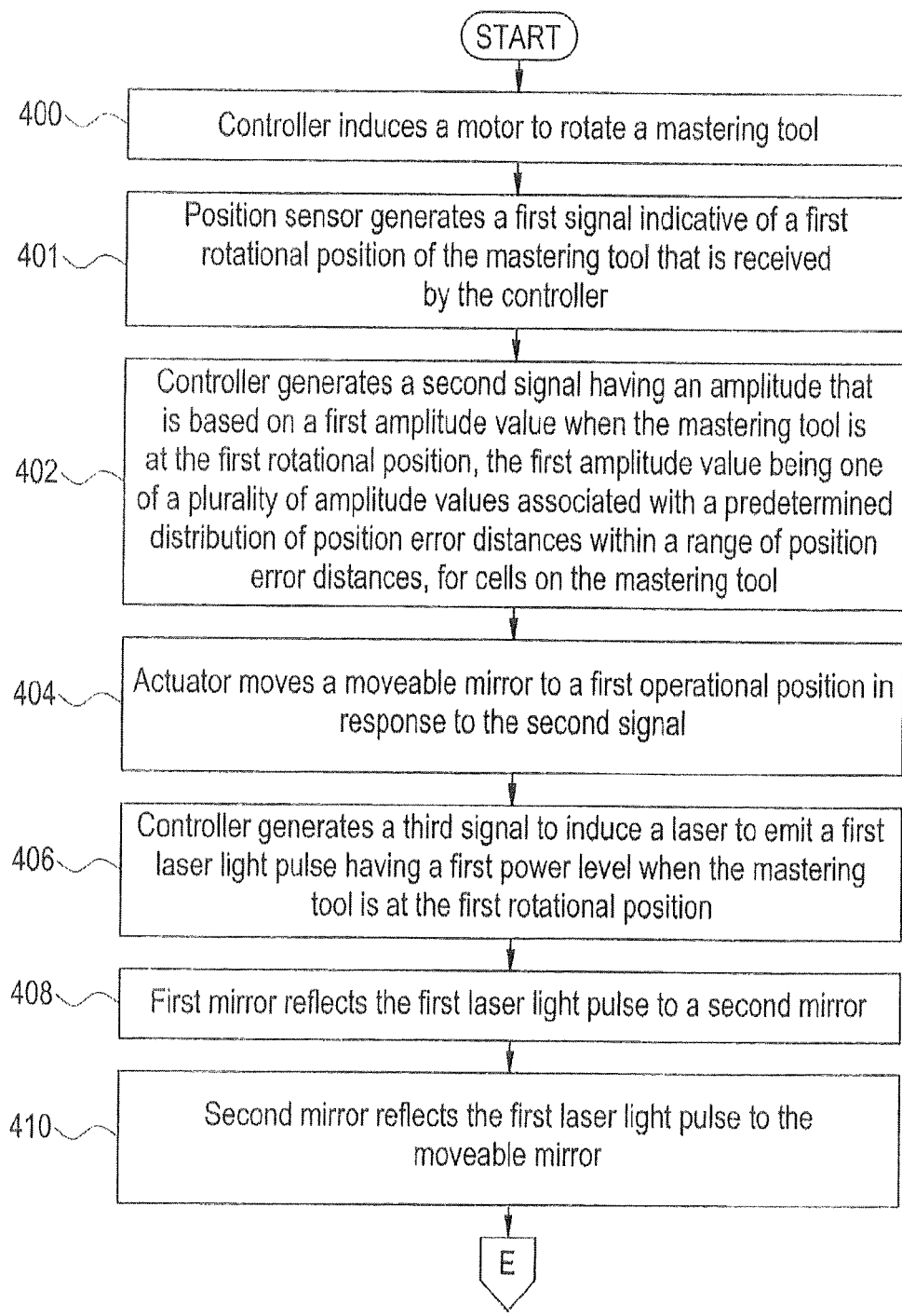
FIGS. 26-30 are flowcharts of a method for forming a plurality of cells on a mastering tool utilizing the system of FIG. 18 in accordance with another exemplary embodiment.
Figure 27:
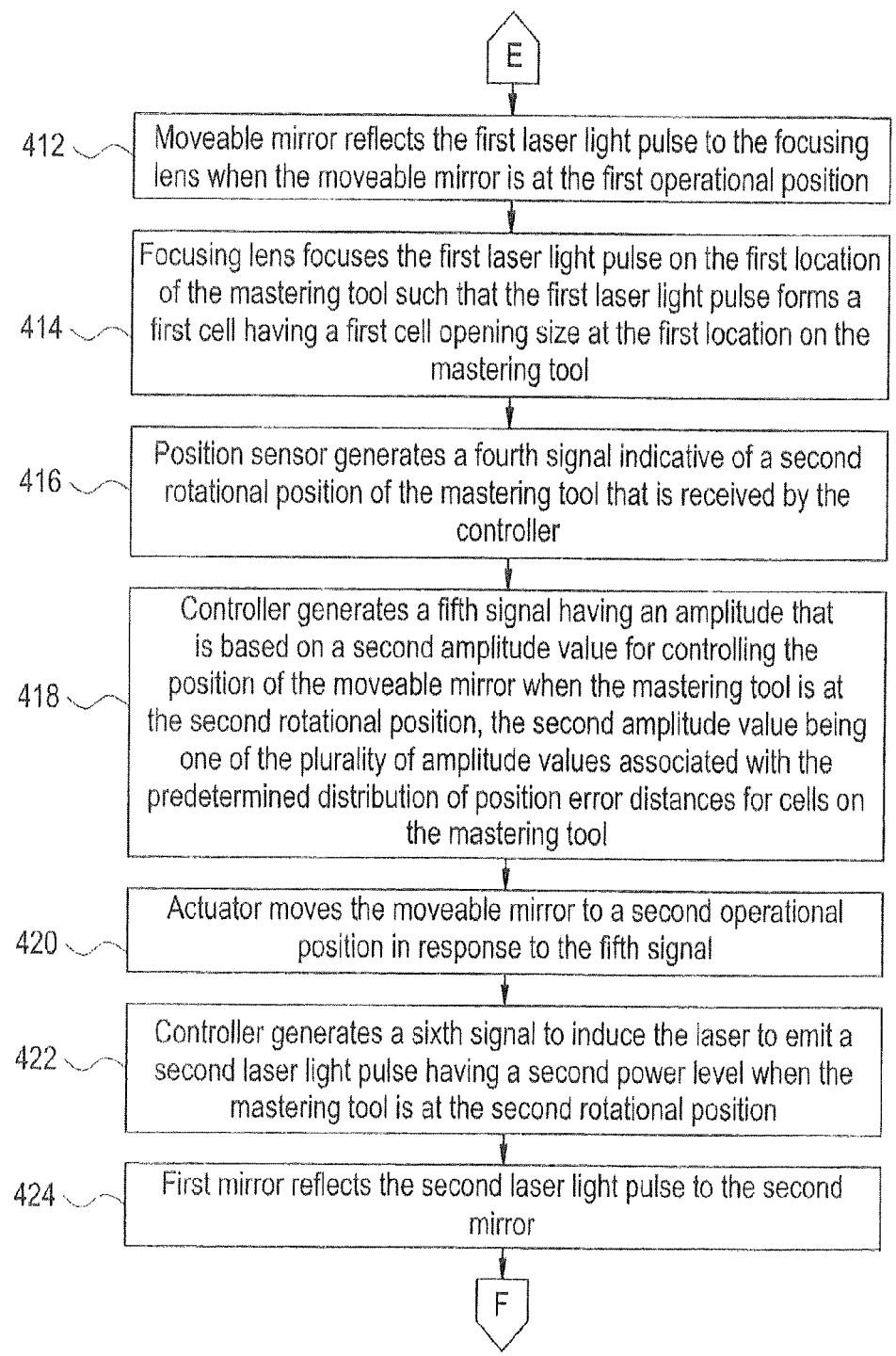
Figure 28:
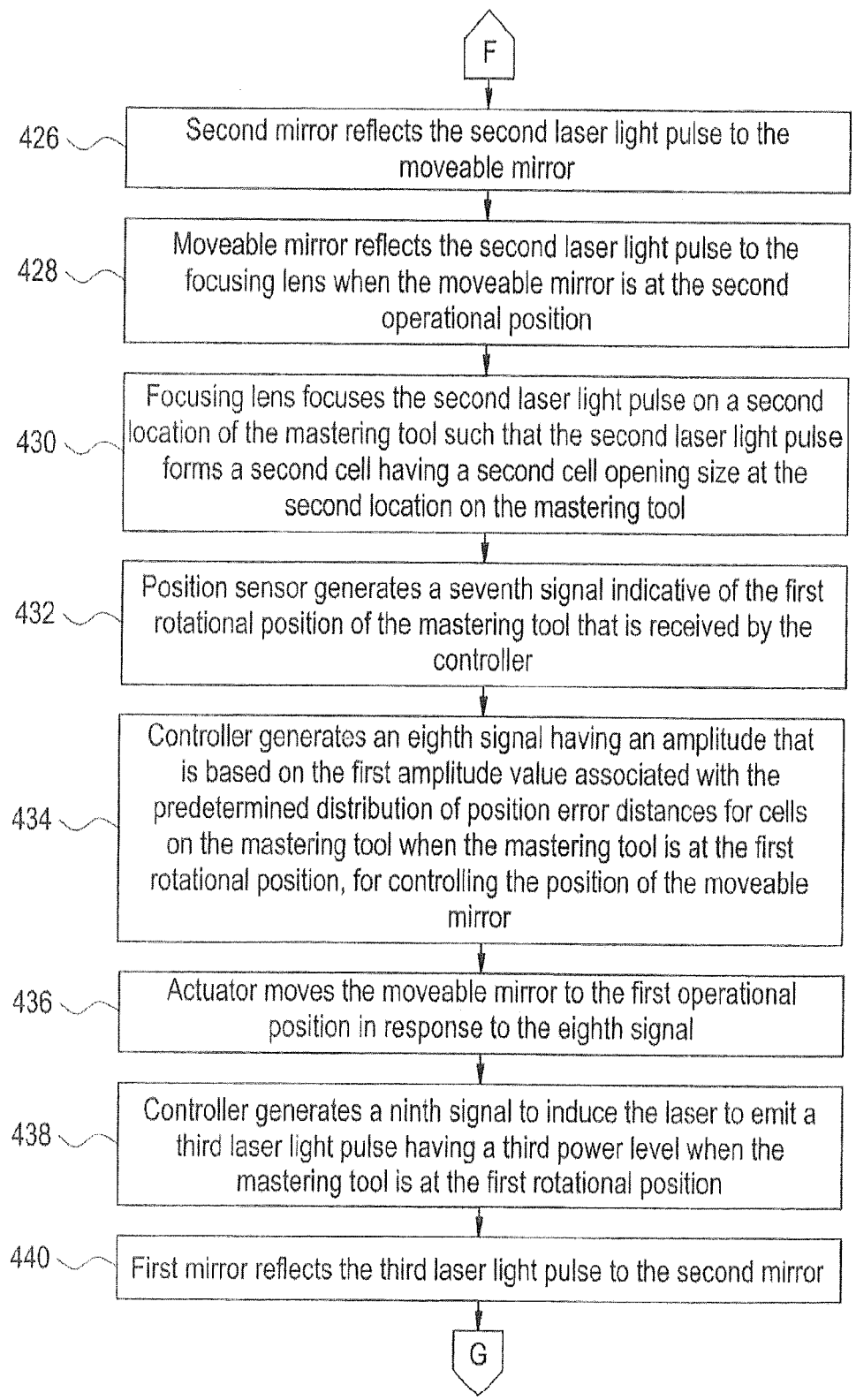
Figure 29:
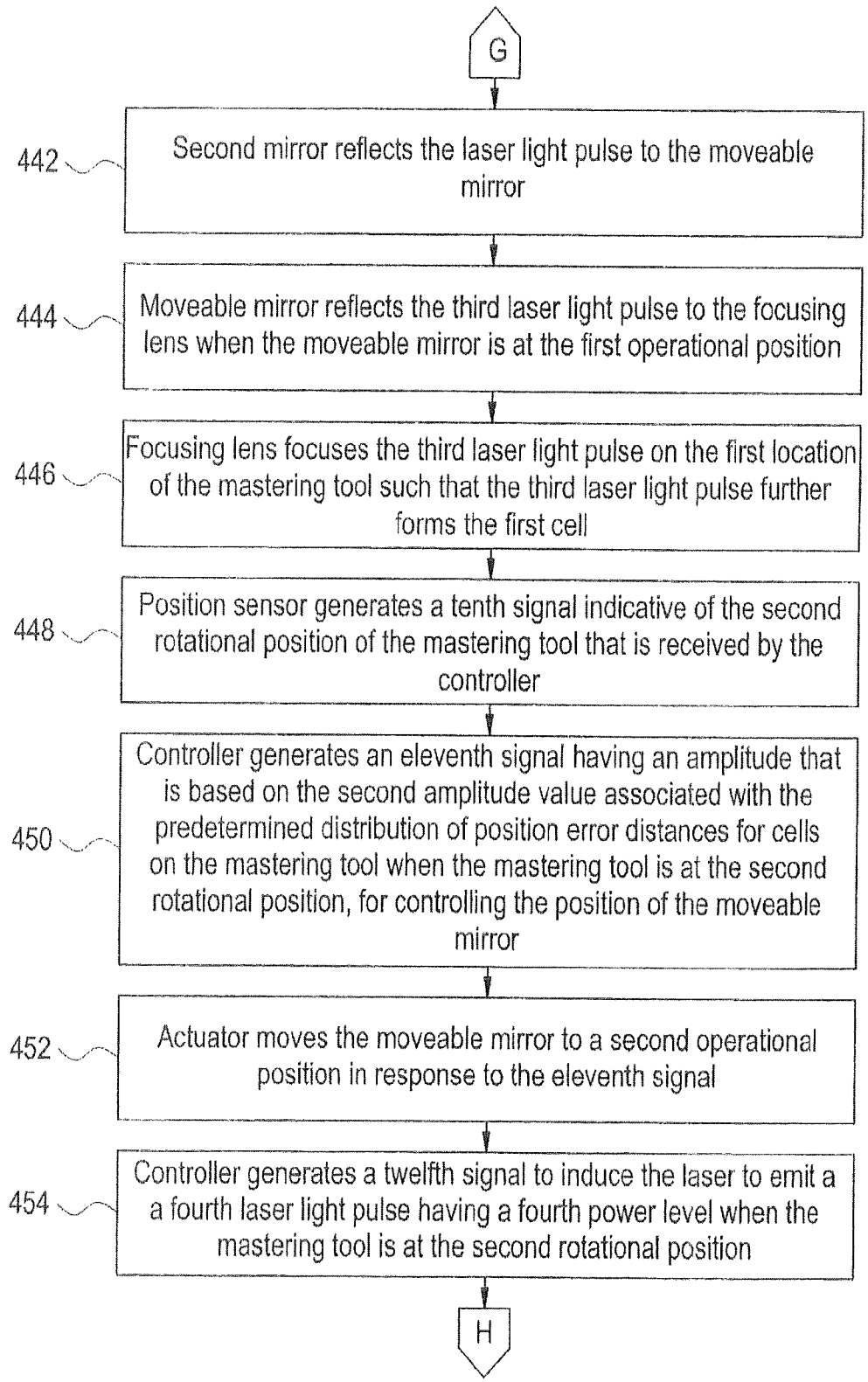
Figure 30:
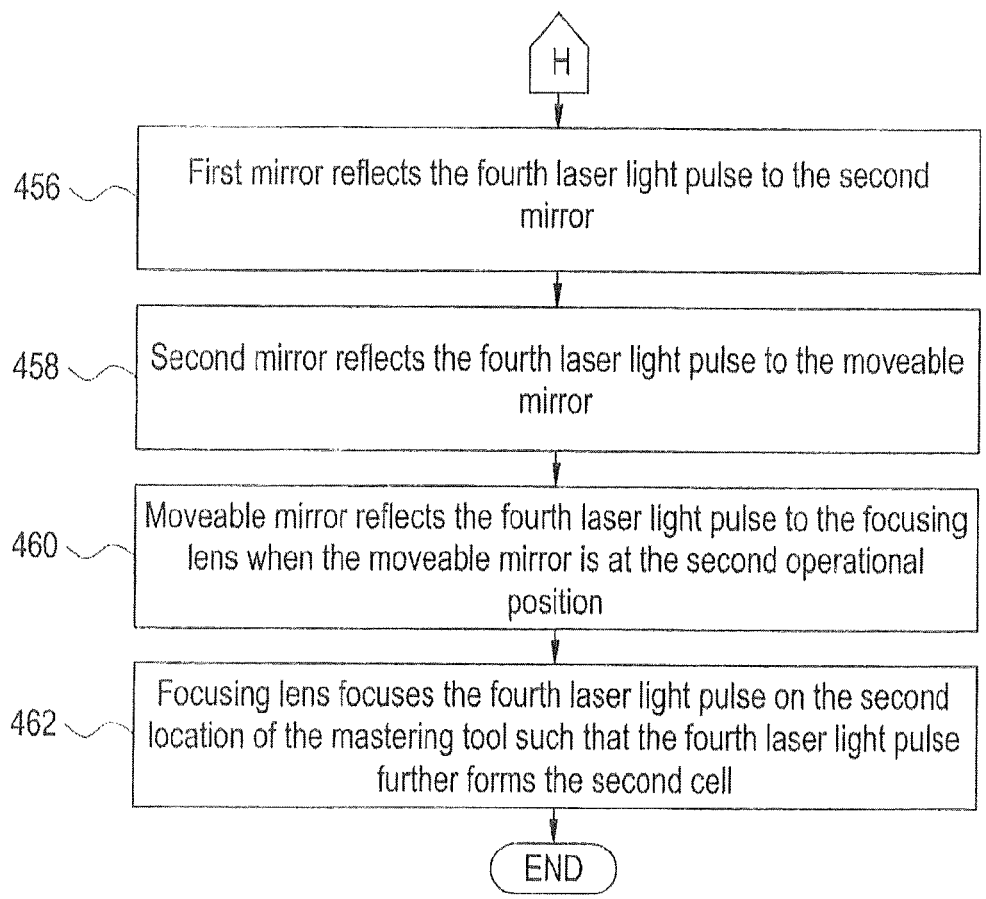

Referring to FIG. 25, a plurality of lines 379 for illustrating another exemplary positioning of center points of cells on an alternative embodiment of the mastering tool 254 utilizing a cell placement randomization methodology are provided. Although the plurality of lines 379 extend around the mastering tool 254, the lines 379 are illustrated in a 2-D view for purposes of discussion. Each line of lines 379 having varying distances between adjacent lines. It should be further noted that each line of lines 379 extends through center points (not shown) of cells that are disposed intermittently around the mastering tool 254. For example, the line 380 extends through center points of cells that extend around the mastering tool 254 that are formed when the carriage device 276 is disposed at a first axial position relative to the mastering tool 254 and the mastering tool 254 is rotated 360 degrees. Further, for example, the line 382 extends through center points of cells that extend around the mastering tool 254 that are formed when the carriage device 276 is disposed at a second axial position relative to the mastering tool 254 and the mastering tool 254 is rotated 360 degrees. Further, for example, the line 384 extends through center points of cells that extend around the mastering tool 254 that are formed when the carriage device 276 is disposed at a third axial position relative to the mastering tool 254 and the mastering tool 254 is rotated 360 degrees. Further, for example, the line 386 extends through center points of cells that extend around the mastering tool 254 that are formed when the carriage device 276 is disposed at a fourth axial position relative to the mastering tool 254 and the mastering tool 254 is rotated 360 degrees.

Referring to FIGS. 26-30, a method for forming a plurality of cells on the mastering tool 254 utilizing the system 250 will now be explained. In particular, for purposes of simplicity, the method will describe the steps for forming first and second cells on the mastering tool 254 utilizing the system 250. It should be noted that steps 400-430 describe utilizing a single laser light pulse for forming each respective cell on the mastering tool 254. Still further, the steps 432-462 are optional steps that would only be utilized when additional laser light pulses are utilized for forming the first and second cells on the mastering tool 254. Still further, it should be noted, that when the system 250 forms a textured surface on the mastering tool 254, the system 250 would form a plurality of additional cells in the mastering tool 254 utilizing steps similar to those described below.

At step 400, the controller 284 induces the motor 280 to rotate the mastering tool 254.

At step 401, the position sensor 282 generates a first signal indicative of a first rotational position of the mastering tool 254 that is received by the controller 284.

At step 402, the controller 284 generates a second signal having an amplitude that is based on a first amplitude value when the mastering tool 254 is at the first rotational position. The first amplitude value is one of a plurality of amplitude values associated with a predetermined distribution of position error distances within a range of position error distances, for cells on the mastering tool 254.

At step 404, the actuator 272 moves the moveable mirror 268 to a first operational position in response to the second signal.

At step 406, the controller 284 generates a third signal to induce the laser 260 to emit a first laser light pulse having a first power level when the mastering tool 254 is at the first rotational position.

At step 408, the mirror 264 reflects the first laser light pulse to the mirror 266.

At step 410, the mirror 266 reflects the first laser light pulse to the moveable mirror 268.

At step 412, the moveable mirror 268 reflects the first laser light pulse to the focusing lens 274 when the moveable mirror 268 is at the first operational position.

At step 414, the focusing lens 274 focuses the first laser light pulse on the first location of the mastering tool 254 such that the first laser light pulse forms a first cell having a first cell opening size at the first location on the mastering tool 254.

At step 416, the position sensor 282 generates a fourth signal indicative of a second rotational position of the mastering tool 254 that is received by the controller 284.

At step 418, the controller 284 generates a fifth signal having an amplitude that is based on a second amplitude value for controlling the position of the moveable mirror 268 when the mastering tool 254 is at the second rotational position. The second amplitude value is one of the plurality of amplitude values associated with the predetermined distribution of position error distances for cells on the mastering tool 254.

At step 420, the actuator 272 moves the moveable mirror 268 to a second operational position in response to the fifth signal.

At step 422, the controller 284 generates a sixth signal to induce the laser 260 to emit a second laser light pulse having a second power level when the mastering tool 254 is at the second rotational position.

At step 424, the mirror 264 reflects the second laser light pulse to the mirror 266.

At step 426, the mirror 266 reflects the second laser light pulse to the moveable mirror 268.

At step 428, the movable mirror 268 reflects the second laser light pulse to the focusing lens 274 when the moveable mirror 268 is at the second operational position.

At step 430, the focusing lens 274 focuses the second laser light pulse on a second location of the mastering tool 254 such that the second laser light pulse forms a second cell having a second cell opening size at the second location on the mastering tool 254.

At step 432, the position sensor 282 generates a seventh signal indicative of the first rotational position of the mastering tool 254 that is received by the controller 284.

At step 434, the controller 284 generates an eighth signal having an amplitude that is based on the first amplitude value associated with the predetermined distribution of position error distances for cells on the mastering tool 254 when the mastering tool 254 is at the first rotational position, for controlling the position of the moveable mirror 268.

At step 436, the actuator 272 moves the moveable mirror 268 to the first operational position in response to the eighth signal.

At step 438, the controller 284 generates a ninth signal to induce the laser 260 to emit a third laser light pulse having a third power level when the mastering tool 254 is at the first rotational position.

At step 440, the mirror 264 reflects the third laser light pulse to the mirror 266.

At step 442, the mirror 266 reflects the third laser light pulse to the moveable mirror 268.

At step 444, the moveable mirror 268 reflects the third laser light pulse to the focusing lens 274 when the moveable mirror 268 is at the first operational position.

At step 446, the focusing lens 274 focuses the third laser light pulse on the first location of the mastering tool 254 such that the third laser light pulse further forms the first cell.

At step 448, the position sensor 282 generates a tenth signal indicative of the second rotational position of the mastering tool 254 that is received by the controller 284.

At step 450, the controller 284 generates an eleventh signal having an amplitude that is based on the second amplitude value associated with the predetermined distribution of position error distances for cells on the mastering tool 254 when the mastering tool 254 is at the second rotational position, for controlling the position of the moveable mirror 268.

At step 452, the actuator 272 moves the moveable mirror 268 to the second operational position in response to the eleventh signal.

At step 454, the controller 284 generates a twelfth signal to induce the laser 260 to emit a fourth laser light pulse having a fourth power level when the mastering tool 254 is at the second rotational position.

At step 456, the mirror 264 reflects the fourth laser light pulse to the mirror 266.

At step 458, the mirror 266 reflects the fourth laser light pulse to the moveable mirror 268.

At step 460, the moveable mirror 268 reflects the fourth laser light pulse to the focusing lens 274 when the moveable mirror 268 is at the second operational position.

At step 462, the focusing lens 274 focuses the fourth laser light pulse on the second location of the mastering tool 254 such that the fourth laser light pulse further forms the second cell. After step 462, the method is exited.

Figure 31:
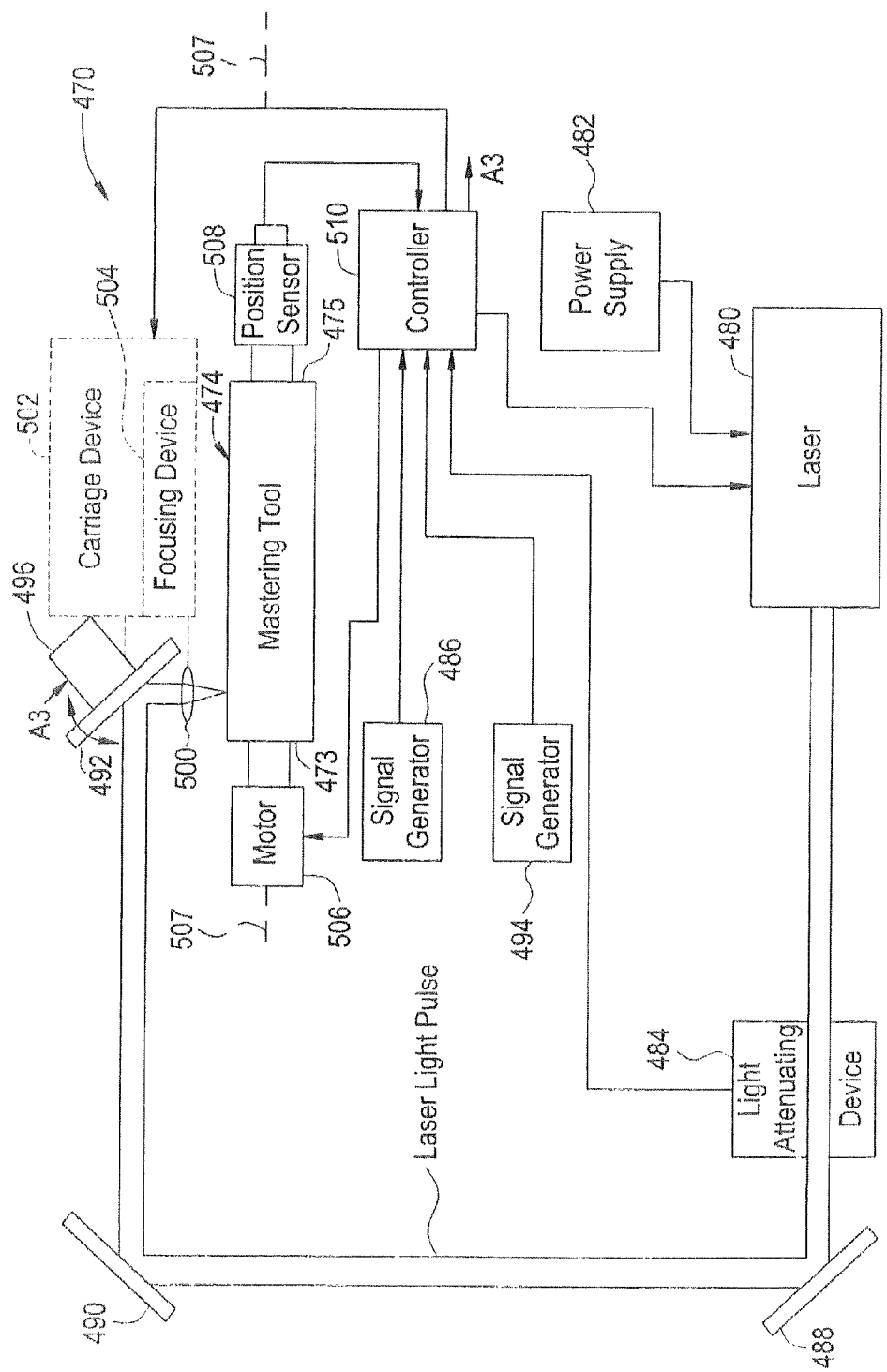
FIG. 31 is a schematic of a system for forming a plurality of cells on a mastering tool utilizing both cell placement randomization and cell geometry randomization in accordance with another exemplary embodiment.

Referring to FIG. 31, a system 470 for forming a plurality of cells on a mastering tool 474 is provided. An advantage of the system 470 is that the system 470 utilizes a combined cell placement randomization and cell geometry randomization methodology to vary both the placement of cells and the opening size of cells on the mastering tool 474 in accordance with first and second predetermined distributions. As a result, the mastering tool 474 has a textured surface that can form a textured film that does not have the undesirable banding and patterns discussed above. The system 470 includes a laser 480, a power supply 482, a light attenuating device 484, a signal generator of 486, mirrors 488, 490, 492, a signal generator 494, an actuator 496, a focusing lens 500, a carriage device 502, a focusing device 504, a motor 506, a position sensor 508, and a controller 510.

The laser 480 is provided to generate a plurality of laser light pulses that are used to form a plurality of cells on the mastering tool 474. In the illustrated exemplary embodiment, the laser 480 comprises a single mode Q-switched YAG laser having a substantially similar structure as laser 60. It should be noted that in alternative embodiments, the laser 480 can comprise any known laser capable of forming cells on a mastering tool. For example, in an alternative embodiment the laser 480 can comprise a single mode continuous-mode Ytterbium fiber laser. The laser 480 is controlled via the control signal from the controller 510. Further, the laser 480 receives electrical power from the power supply 482.

The signal generator 486 is provided to generate a plurality of amplitude values that are received by the controller 510 and subsequently utilized by the controller 510 to induce the light attenuating device 484 to vary power levels of laser light pulses utilized to form the plurality of cells. It should be noted that by varying a power level of laser light pulses, the cell opening sizes and the cell depths of cells formed on the mastering tool 474 can be varied.

The light attenuating device 484 is provided to attenuate power levels of a plurality of laser light pulses received from the laser 480, based on control signals from the controller 510. In particular, the light attenuating device 484 receives a laser light pulse at a power level from the laser 480 and attenuates the laser light pulse to another power level, based on the control signal from the controller 510. The light attenuating device 484 is disposed between the laser 480 and the mirror 488.

The mirror 488 is provided to receive laser light pulses from the laser 480 and to reflect the laser light pulses to the mirror 490. In the illustrated embodiment, the mirror 488 is a stationary mirror. However, in an alternative embodiment, the mirror 488 is configured as a moveable mirror whose position can be changed based on a control signal from the controller 510, to vary a direction of reflected laser light pulses toward the mirror 490.

The mirror 490 is provided to receive laser light pulses from the mirror 488 and to reflect the laser light pulses to the mirror 492. In the illustrated embodiment, the mirror 490 is a stationary mirror. However, in an alternative embodiment, the mirror 490 is configured as a moveable mirror whose position can be changed based on a control signal from the controller 510, to vary a direction of reflected laser light pulses toward the mirror 492.

The mirror 492 is provided to receive laser light pulses from the mirror 490 and to reflect the laser light pulses to the focusing lens 500. The mirror 492 is coupled to the carriage device 502 that moves the mirror 492 generally parallel to the mastering tool 474 from an end 473 to an end 475 of the mastering tool 474. The actuator 496 is operably coupled to the mirror 492 and is provided to rotate the mirror 492 to desired operational positions, based upon control signals from the controller 510.

The signal generator 494 is provided to generate a plurality of amplitude values that are received by the controller 510 and subsequently utilized by the controller 510 to generate control signals to induce the actuator 496 to move the mirror 492 to desired operational positions to form the plurality of cells at desired locations on the mastering tool 474. It should be noted that by varying the operational position of the mirror 492, the placement of the plurality of cells on the mastering tool 474 can be varied.

The focusing lens 500 is provided to receive a plurality of laser light pulses from the mirror 492 and to focus each of the laser light pulses. In one exemplary embodiment, the focusing lens 500 has a focal length of 40 millimeters. In alternative embodiments, the focusing lens 500 has a focal length of 50 millimeters and 80 millimeters. Of course, the focusing lens 500 can have focal lengths between 40-80 millimeters, or less than 40 millimeters, or greater than 80 millimeters.

The focusing device 504 is provided to move the mirror 492 either upwardly or downwardly towards the mastering tool 474 to adjust a focal point of the laser light pulse relative to the mastering tool 474, based on a control signal from the controller 510. The focusing device 504 is physically coupled to both the carriage device 502 and the focusing lens 500 and is electrically coupled to the controller 510.

The carriage device 502 is provided to move the mirror 492, the focusing device 504, and the focusing lens 500 from the end 473 to the end 475 of the mastering tool 474, based on the control signal from the controller 510. It should be noted that during operation when the carriage device 502 is stopped at a position relative to the mastering tool 474, the mastering tool 474 can be rotated such that the laser light pulses can form a plurality of cells around a circumference of the mastering tool 474, before the carriage device 502 moves to another axial position relative to the mastering tool 474. The carriage device 502 is physically coupled to the mirror 492, the focusing device 504, and the focusing lens 500, and is electrically coupled to the controller 510.

It should be noted that in an alternative embodiment, the laser 480 and the light attenuating device 484 are directly coupled to the carriage device 502. In this alternative embodiment, the laser 480 emits laser light pulses to the light attenuating device 484 that directs the laser light pulses to the moveable mirror 492. The moveable mirror 492 directs the laser light pulses to the focusing lens 500. The focusing lens 500 directs the laser light pulses to the mastering tool 474 to form cells on the mastering tool 474.

The motor 506 is provided to rotate the mastering tool 474 about an axis 507 at a predetermined speed, in response to control signal from the controller 510. The motor 506 is physically coupled to the mastering tool 474 and electrically coupled to the controller 510.

The position sensor 508 is provided to generate a signal indicative of a rotational position of the mastering tool 474. The position sensor 508 is physically coupled to the mastering tool 474 and is electrically coupled to the controller 510.

The controller 510 is provided to control operation of the components of the system 470 for forming a plurality of cells on the mastering tool 474. In particular, the controller 510 is configured to control operation of the laser 480, the carriage device 502, the focusing device 504, and the motor 506. Further, the controller 510 is configured to receive amplitude values from the signal generator 494 and to generate control signals for inducing the actuator 496 to move the mirror 492 to desired operational positions. By varying the amplitude values, the position of the mirror 492 is varied such that the placement of the placement of a plurality of cells on the mastering tool 474 is varied. Still further, the controller 510 is configured to receive amplitude values from the signal generator 486 for controlling the light attenuating device 484 to vary a power level of emitted laser light pulses from the device 484. By varying the power level of emitted laser light pulses from the device 484, the cell opening size of cells formed on the mastering tool 474 are varied. Still further, the controller 510 is configured to receive position signals from the position sensor 508, which can be utilized to accurately position the mastering tool 474 at desired rotational positions. The controller 510 includes a CPU, a computer readable medium such as a ROM and a RAM, and an I/O interface (not shown). The CPU executes the software algorithms stored in the computer readable medium for implementing the control methodology described below with respect to system 470.

Figure 32:
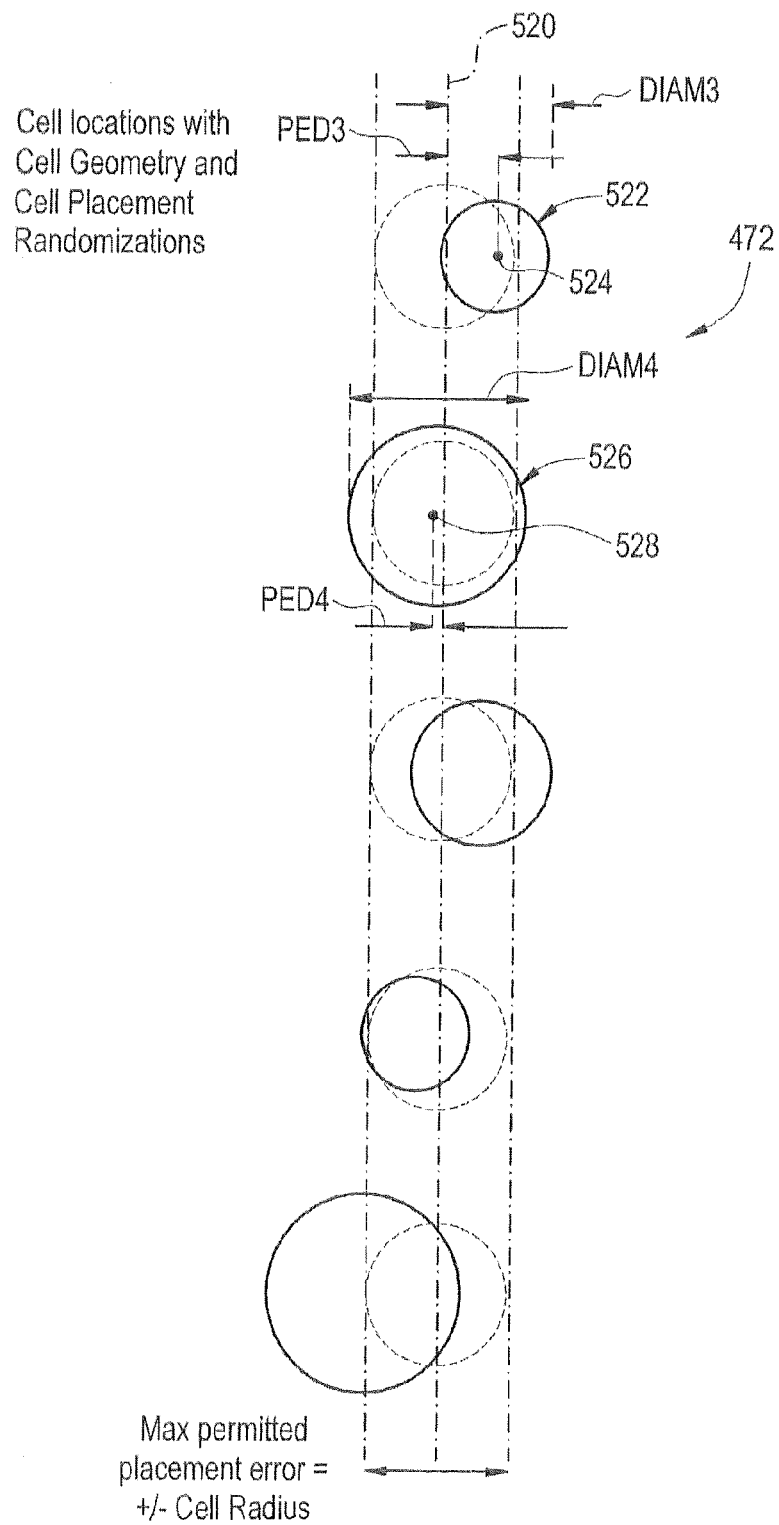
FIG. 32 is a schematic of a plurality of cells on a mastering tool having cell placement randomization and cell geometry randomization.
Figure 33:
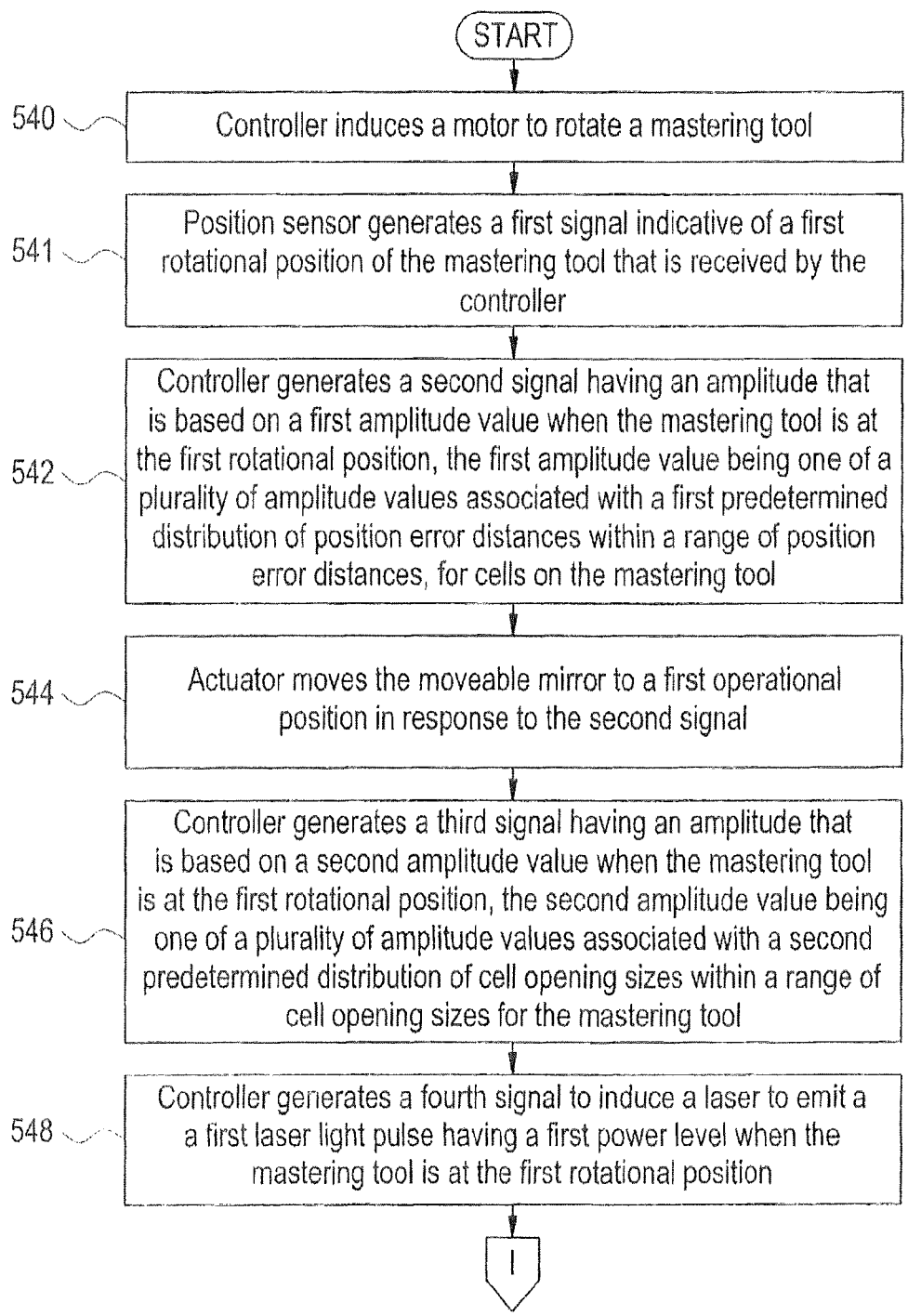
FIGS. 33-38 are flowcharts of a method for forming a plurality of cells on a mastering tool utilizing the system of FIG. 31 in accordance with another exemplary embodiment.
Figure 34:
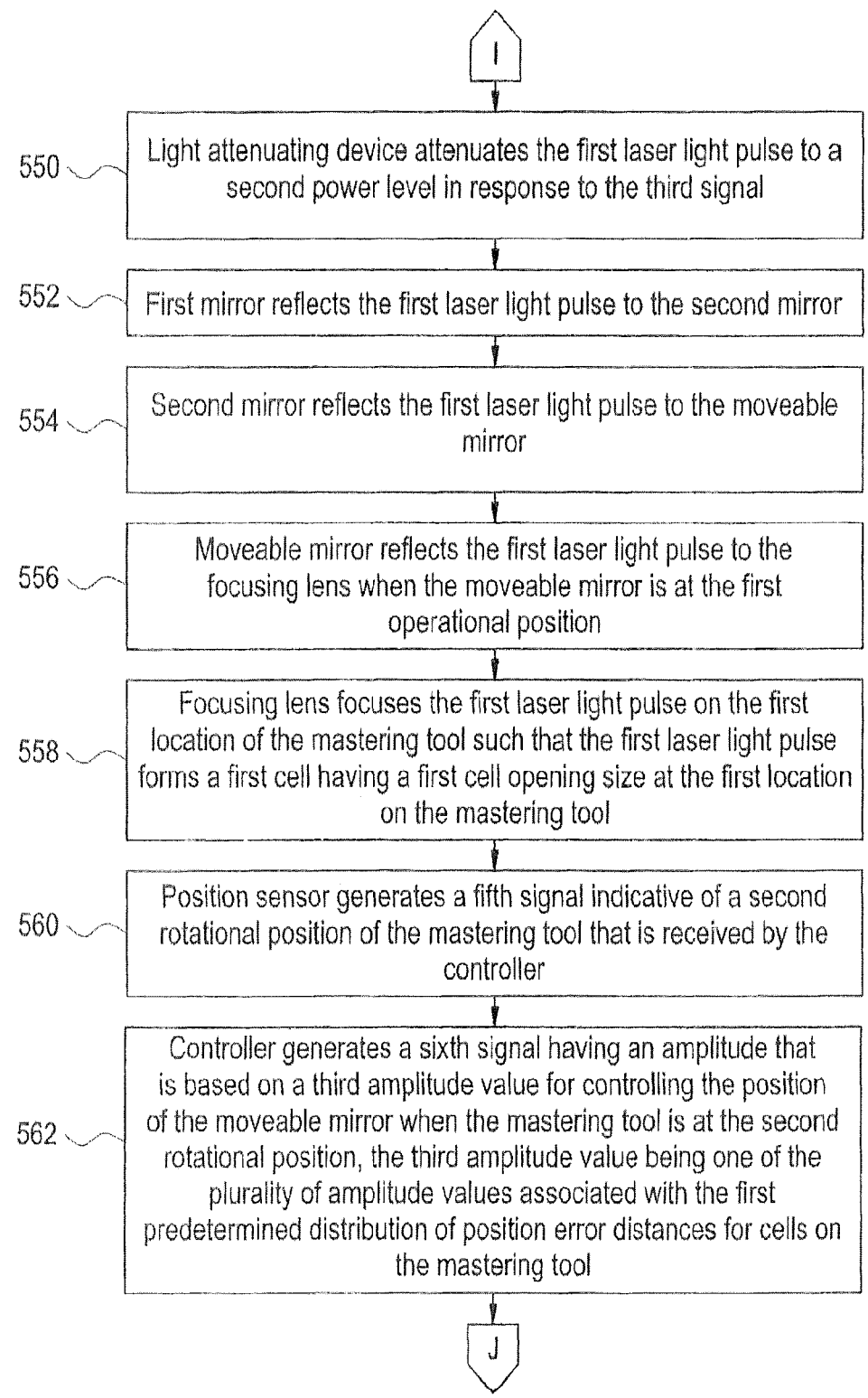
Figure 35:
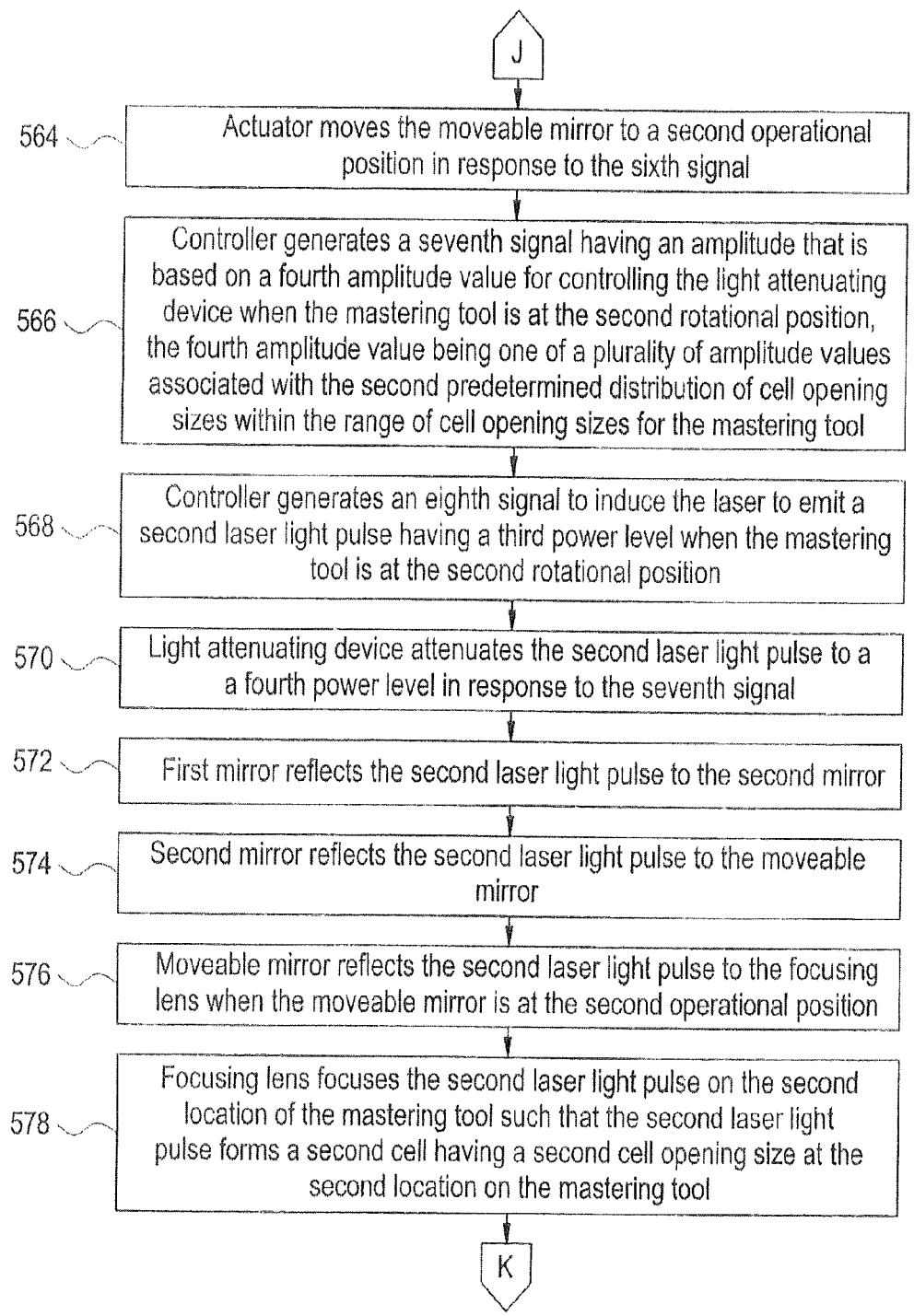
Figure 36:
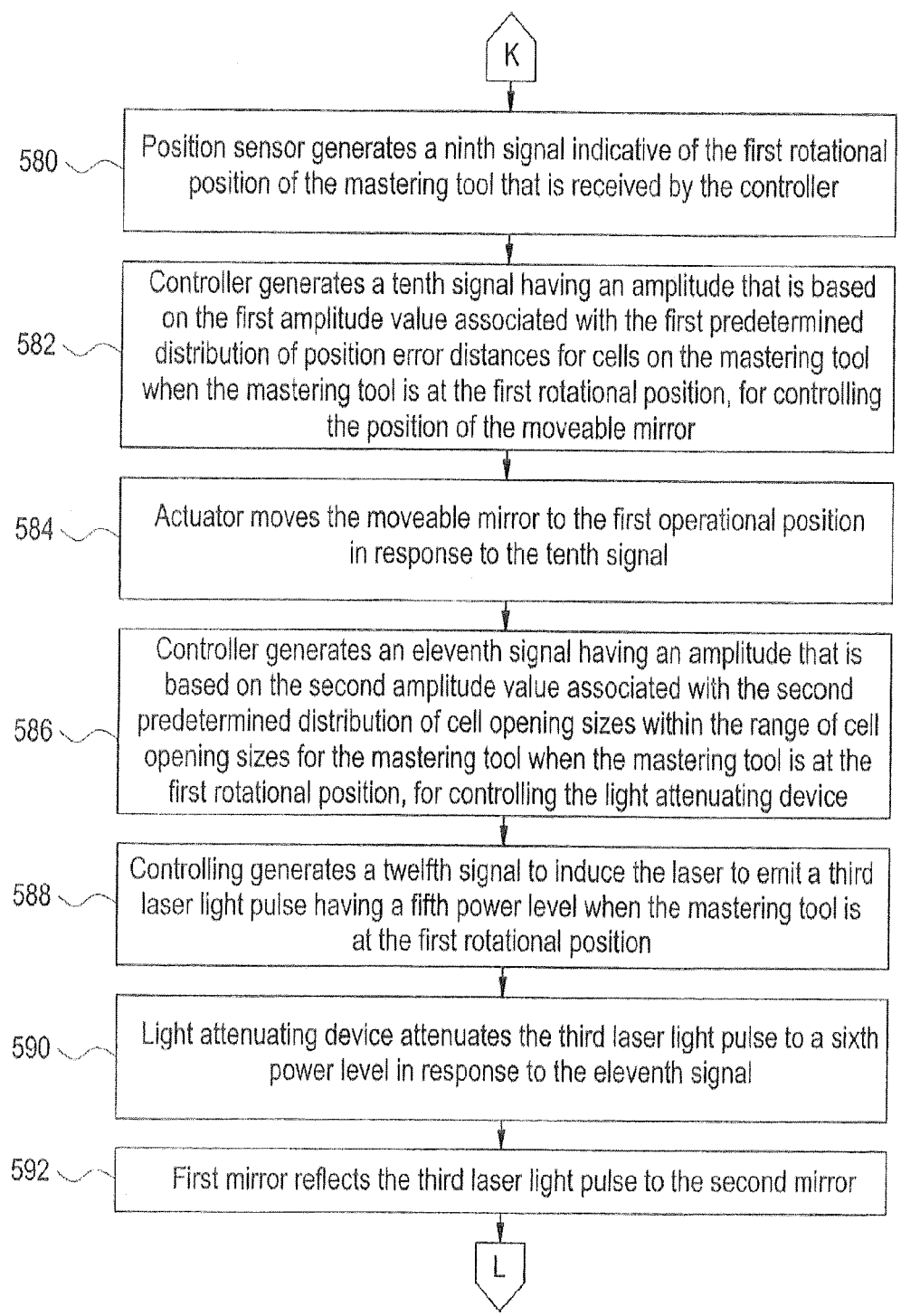
Figure 37:
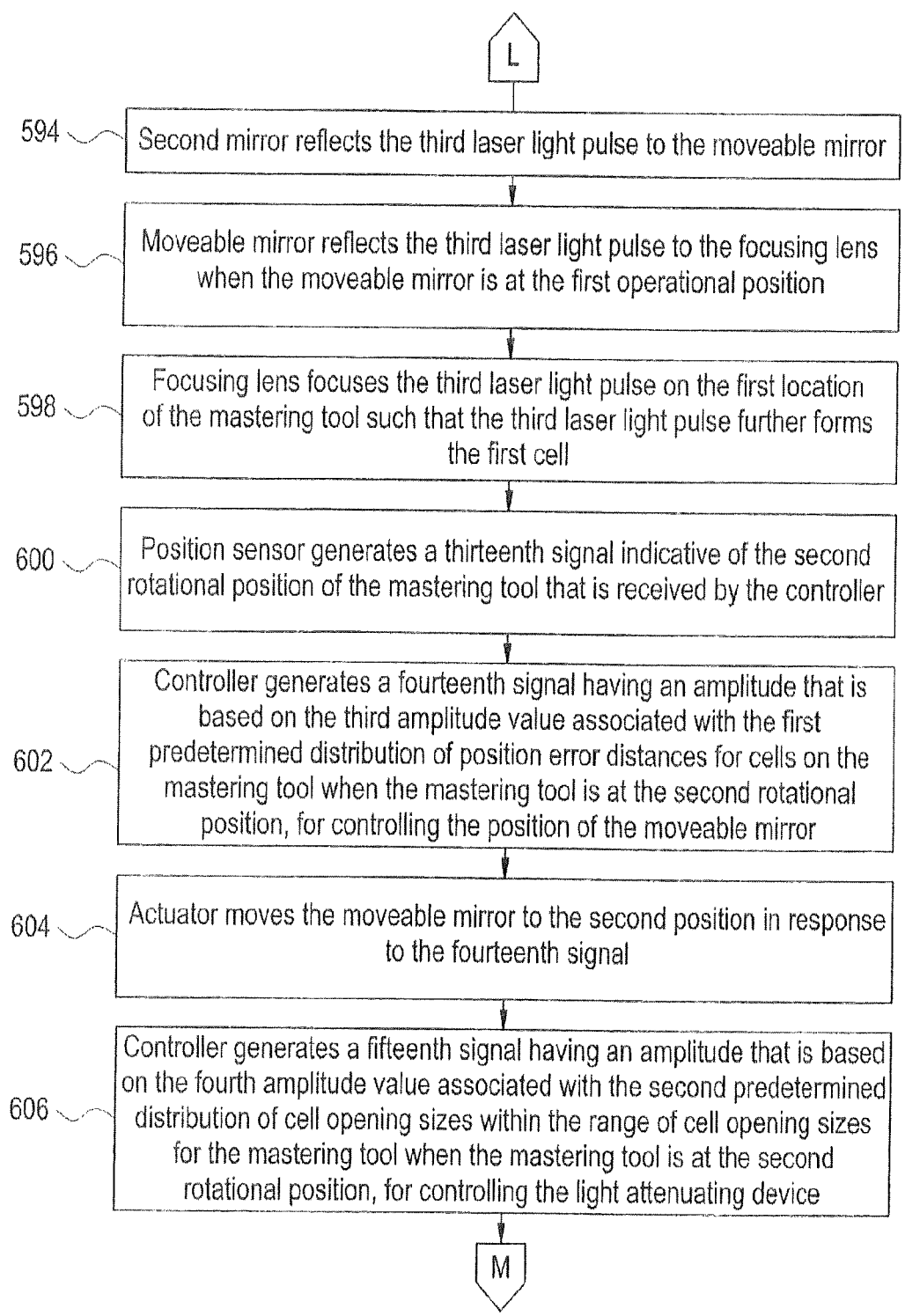
Figure 38:
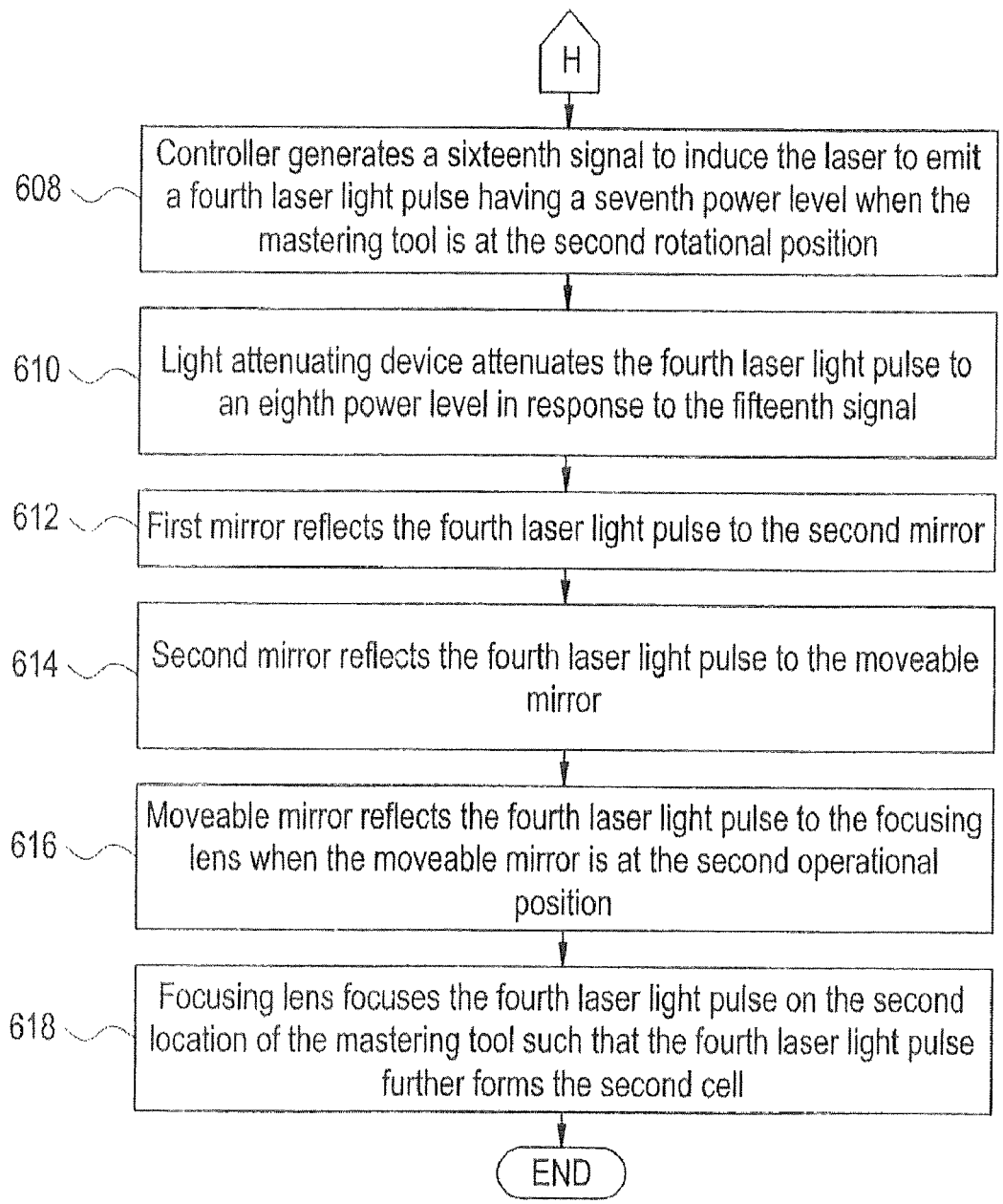

Referring to FIG. 32, a brief explanation of a layout of a plurality of cells on a region of the mastering tool 474 with both cell placement randomization and cell geometry randomization will be explained. As shown, the plurality of cells 472 are disposed on the mastering tool 474 proximate a circumferential line 520 that extends around the mastering tool 474. It should be noted that for purposes of simplicity, the circumferential line 520 is shown in a 2-D view. Further, the center points of each of the cells in the plurality of cells 472 are disposed at predetermined position error distances from the circumferential line 520. For example, the center point 524 of the cell 522 is disposed at a position error distance (PED3) from the circumferential line 520. The cell 522 also has a diameter (DIAM3). Further, for example, the center point 528 of the cell 526 is disposed at a position error distance (PED4) from the circumferential line 520, which is less than the position error distance (PED3). The cell 526 also has a diameter (DIAM4) that is greater than the diameter (DIAM3) of the cell 522.

Referring to FIGS. 33-38, a method for forming a plurality of cells on the mastering tool 474 utilizing the system 470 will now be explained. In particular, for purposes of simplicity, the method will describe the steps for forming first and second cells on the mastering tool 474 utilizing the system 470. It should be noted that steps 540-578 describe utilizing a single laser light pulse for forming each respective cell on the mastering tool 474. Still further, the steps 580-618 are optional steps that would only be utilized when additional laser light pulses are utilized for forming the first and second cells on the mastering tool 474. Still further, it should be noted, that when the system 470 forms a textured surface on the mastering tool 474, the system 470 would form a plurality of additional cells in the mastering tool 474 utilizing steps similar to those described below.

At step 540, the controller 510 induces the motor 506 to rotate the mastering tool 474.

At step 540, the position sensor 508 generates a first signal indicative of a first rotational position of the mastering tool 474 that is received by the controller 510.

At step 542, the controller 510 generates a second signal having an amplitude that is based on a first amplitude value when the mastering tool 474 is at the first rotational position. The first amplitude value is one of a plurality of amplitude values associated with a first predetermined distribution of position error distances within a range of position error distances, for cells on the mastering tool 474.

At step 544, the actuator 496 moves the moveable mirror 492 to a first operational position in response to the second signal.

At step 546, the controller 510 generates a third signal having an amplitude that is based on a second amplitude value when the mastering tool 474 is at the first rotational position. The second amplitude value is one of a plurality of amplitude values associated with a second predetermined distribution of cell opening sizes within a range of cell opening sizes for the mastering tool 474.

At step 548, the controller 510 generates a fourth signal to induce the laser 480 to emit a first laser light pulse having a first power level.

At step 550, the light attenuating device 484 attenuates the first laser light pulse to a second power level in response to the third signal.

At step 552, the mirror 488 reflects the first laser light pulse to the mirror 490.

At step 554, the mirror 490 reflects the first laser light pulse to the moveable mirror 492.

At step 556, the moveable mirror 492 reflects the first laser light pulse to the focusing lens 500 when the moveable mirror 492 is at the first operational position.

At step 558, the focusing lens 500 focuses the first laser light pulse on the first location of the mastering tool 474 such that the first laser light pulse forms a first cell having a first cell opening size at the first location on the mastering tool 474.

At step 560, the position sensor 508 generates a fifth signal indicative of a second rotational position of the mastering tool 474 that is received by the controller 510.

At step 562, the controller 510 generates a sixth signal having an amplitude that is based on a third amplitude value for controlling the position of the moveable mirror 492 when the mastering tool 474 is at the second rotational position. The third amplitude value is one of the plurality of amplitude values associated with the first predetermined distribution of position error distances for cells on the mastering tool 474.

At step 564, the actuator 496 moves the moveable mirror 492 to a second operational position in response to the sixth signal.

At step 566, the controller 510 generates a seventh signal having an amplitude that is based on a fourth amplitude value for controlling the light attenuating device 484 when the mastering tool 474 is at the second rotational position. The fourth amplitude value is one of a plurality of amplitude values associated with the second predetermined distribution of cell opening sizes within the range of cell opening sizes for the mastering tool 474.

At step 568, the controller 510 generates an eighth signal to induce the laser 480 to emit a second laser light pulse having a third power level when the mastering tool 474 is at the second rotational position.

At step 570, the light attenuating device 484 attenuates the second laser light pulse to a fourth power level in response to the seventh signal.

At step 572, the mirror 488 reflects the second laser light pulse to the mirror 490.

At step 574, the mirror 490 reflects the second laser light pulse to the moveable mirror 492.

At step 576, the moveable mirror 492 reflects the second laser light pulse to the focusing lens 500 when the moveable mirror 492 is at the second operational position.

At step 578, the focusing lens 500 focuses the second laser light pulse on the second location of the mastering tool 474 such that the second laser light pulse forms a second cell having a second cell opening size at the second location on the mastering tool 474.

At step 580, the position sensor 508 generates a ninth signal indicative of the first rotational position of the mastering tool 474 that is received by the controller 510.

At step 582, the controller 510 generates a tenth signal having an amplitude that is based on the first amplitude value associated with the first predetermined distribution of position error distances for cells on the mastering tool 474 when the mastering tool 474 is at the first rotational position, for controlling the position of the moveable mirror 492.

At step 584, the actuator 496 moves the moveable mirror 492 to the first operational position in response to the tenth signal.

At step 586, the controller 510 generates an eleventh signal having an amplitude that is based on the second amplitude value associated with the second predetermined distribution of cell opening sizes within the range of cell opening sizes for the mastering tool 474 when the mastering tool 474 is at the first rotational position, for controlling the light attenuating device 484.

At step 588, the controller 510 generates a twelfth signal to induce the laser 480 to emit a third laser light pulse having a fifth power level.

At step 590, the light attenuating device 484 attenuates the third laser light pulse to a sixth power level in response to the eleventh signal.

At step 592, the mirror 488 reflects the third laser light pulse to the mirror 490.

At step 594, the mirror 490 reflects the third laser light pulse to the moveable mirror 492.

At step 596, the movable mirror 492 reflects the third laser light pulse to the focusing lens 500 when the moveable mirror 492 is at the first operational position.

At step 598, the focusing lens 500 focuses the third laser light pulse on the first location of the mastering tool 474 such that the third laser light pulse further forms the first cell.

At step 600, the position sensor 508 generates a thirteenth signal indicative of the second rotational position of the mastering tool 474 that is received by the controller 510.

At step 602, the controller 510 generates a fourteenth signal having an amplitude that is based on the third amplitude value associated with the first predetermined distribution of position error distances for cells on the mastering tool 474 when the mastering tool 474 is at the second rotational position, for controlling the position of the moveable mirror 492.

At step 604, the actuator 496 moves the moveable mirror 492 to the second position in response to the fourteenth signal.

At step 606, the controller 510 generates a fifteenth signal having an amplitude that is based on the fourth amplitude value associated with the second predetermined distribution of cell opening sizes within the range of cell opening sizes for the mastering tool 474 when the mastering tool 474 is at the second rotational position, for controlling the light attenuating device 484.

At step 608, the controller 510 generates a sixteenth signal to induce the laser 480 to emit a fourth laser light pulse having a seventh power level.

At step 610, the light attenuating device 484 attenuates the fourth laser light pulse to an eighth power level in response to the fifteenth signal.

At step 612, the mirror 488 reflects the fourth laser light pulse to the mirror 490.

At step 614, the mirror 490 reflects the fourth laser light pulse to the moveable mirror 492.

At step 616, the movable mirror 492 reflects the fourth laser light pulse to the focusing lens 500 when the moveable mirror 492 is at the second operational position.

At step 618, the focusing lens 500 focuses the fourth laser light pulse on the second location of the mastering tool 474 such that the fourth laser light pulse further forms the second cell. After step 618, the method is exited.

Figure 39:
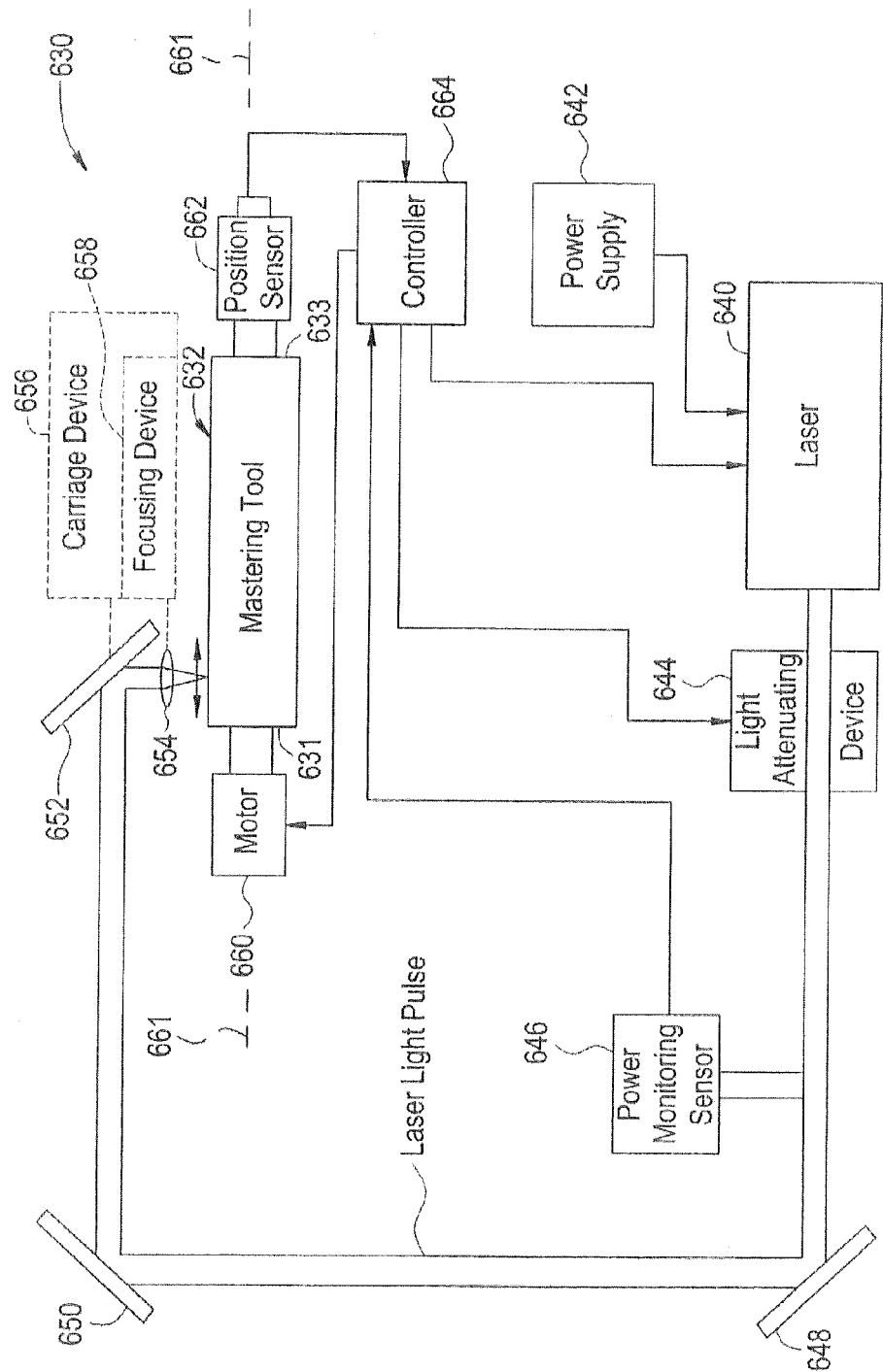
FIG. 39 is a schematic of a system for forming a plurality of cells on a mastering tool in accordance with another exemplary embodiment.

Referring to FIG. 39, a system 630 for forming a plurality of cells on a mastering tool 632 is provided. It should be noted that when forming textured surfaces on a mastering tool such as mastering tool 632, the inventors herein have determined that a change of 2% change or more in an average power of laser light pulses, results in a textured surface on the mastering tool, having undesirable visible patterns on the mastering tool. An advantage of the system 630 is that the system 630 utilizes a control feedback loop to adjust the light attenuating device 644 to output laser light pulses having a desired average power level, even when other operational parameters of the system 630 are varying to maintain the laser light pulses within a desired average power range, with less than a 2% variation in the average power.

The system 630 includes a laser 640, a power supply 642, a light attenuating device 644, a power monitoring sensor 646, mirrors 648, 650, 652, a focusing lens 654, a carriage device 656, a focusing device 658, a motor 660, a position sensor 662, and a controller 664.

The laser 640 is provided to generate a plurality of laser light pulses that are used to form a plurality of cells on the mastering tool 632. In the illustrated exemplary embodiment, the laser 640 comprises a single mode Q-switched YAG laser having a substantially similar as laser 60. It should be noted that in alternative embodiments, the laser 640 can comprise any known laser capable of forming cells on a mastering tool. For example, in an alternative embodiment the laser 640 can comprise a single mode continuous-mode Ytterbium fiber laser. The laser 640 is controlled via the control signal from the controller 664. Further, the laser 640 receives electrical power from the power supply 642.

The light attenuating device 644 is provided to attenuate power levels of a plurality of laser light pulses received from the laser 640, based on control signals from the controller 664. In particular, the light attenuating device 644 receives a laser light pulse at a power level from the laser 640 and attenuates the laser light pulse to another power level, based on the control signal from the controller 664. The light attenuating device 644 is disposed between the laser 640 and the mirror 648.

The power monitoring sensor 646 is provided to monitor an average power level of a plurality of laser light pulses that are transmitted from the light attenuating device 644. In particular, the power monitoring sensor 646 generates a signal indicative of the average power level of the plurality of laser light pulses that are transmitted from the light attenuating device 644, and the signal is transmitted to the controller 664. The controller 664 is configured to compare the measured average power level signal received from the power monitoring sensor 646, to a desired reference average power level value. The controller 664 is further configured to generate a control signal that is received by the light attenuating device 664 to adjust the average power level of a plurality of laser light pulses toward the desired reference average power level.

The mirror 648 is provided to receive laser light pulses from the light attenuating device 644 and to reflect the laser light pulses to the mirror 650. In the illustrated embodiment, the mirror 648 is a stationary mirror. However, in an alternative embodiment, the mirror 648 is configured as a moveable mirror whose position can be changed based on a control signal from the controller 664, to vary a direction of reflected laser light pulses toward the mirror 650.

The mirror 650 is provided to receive laser light pulses from the mirror 648 and to reflect the laser light pulses to the mirror 652. In the illustrated embodiment, the mirror 650 is a stationary mirror. However, in an alternative embodiment, the mirror 650 is configured as a moveable mirror whose position can be changed based on a control signal from the controller 664, to vary a direction of reflected laser light pulses toward the mirror 652.

The mirror 652 is provided to receive laser light pulses from the mirror 650 and to reflect the laser light pulses to the focusing lens 654. The mirror 652 is coupled to the carriage device 656 that moves the mirror 652 generally parallel to the mastering tool 632 from an end 631 to an end 633 of the mastering tool 632.

The focusing lens 654 is provided to receive a plurality of laser light pulses from the mirror 652 and to focus each of the laser light pulses. In one exemplary embodiment, the focusing lens 654 has a focal length of 40 millimeters. In alternative embodiments, the focusing lens 654 has a focal length of 50 millimeters and 80 millimeters. Of course, the focusing lens 654 can have focal lengths between 40-80 millimeters, or less than 40 millimeters, or greater than 80 millimeters.

The focusing device 658 is provided to move the mirror 652 either upwardly or downwardly towards the mastering tool 632 to adjust a focal point of the laser light pulse relative to the mastering tool 632, based on a control signal from the controller 664. The focusing device 658 is physically coupled to both the carriage device 656 and the focusing lens 654 and is electrically coupled to the controller 664.

The carriage device 656 is provided to move the mirror 652, the focusing device 658, and the focusing lens 654 from the end 631 to the end 633 of the mastering tool 632, based on the control signal from the controller 664. It should be noted that during operation when the carriage device 656 is stopped at a position relative to the mastering tool 632, the mastering tool 632 can be rotated such that the laser light pulses can form a plurality of cells around a circumference of the mastering tool 632, before the carriage device 656 moves to another axial position relative to the mastering tool 632. The carriage device 656 is physically coupled to the mirror 652, the focusing device 658, and the focusing lens 654, and is electrically coupled to the controller 664.

The motor 660 is provided to rotate the mastering tool 632 about an axis 661 at a predetermined speed, in response to control signal from the controller 664. The motor 660 is physically coupled to the mastering tool 632 and electrically coupled to the controller 664.

The position sensor 662 is provided to generate a signal indicative of a rotational position of the mastering tool 632. The position sensor 662 is physically coupled to the mastering tool 632 and is electrically coupled to the controller 664.

The controller 664 is provided to control operation of the components of the system 630 for forming a plurality of cells on the mastering tool 632. In particular, the controller 664 is configured to control operation of the laser 640, the light attenuating device 644, the focusing device 658, and the motor 660. The controller 664 is further configured to receive signals from the power monitoring sensor 646 that the controller 664 utilizes to adjust subsequent laser light pulses emitted either from the laser 644 or the light attenuating device 644. The controller 664 includes a CPU, a computer readable medium such as a ROM and a RAM, and an I/O interface (not shown). The CPU executes the software algorithms stored in the computer readable medium for implementing the control methodology described below with respect to system 630.

Figure 40:
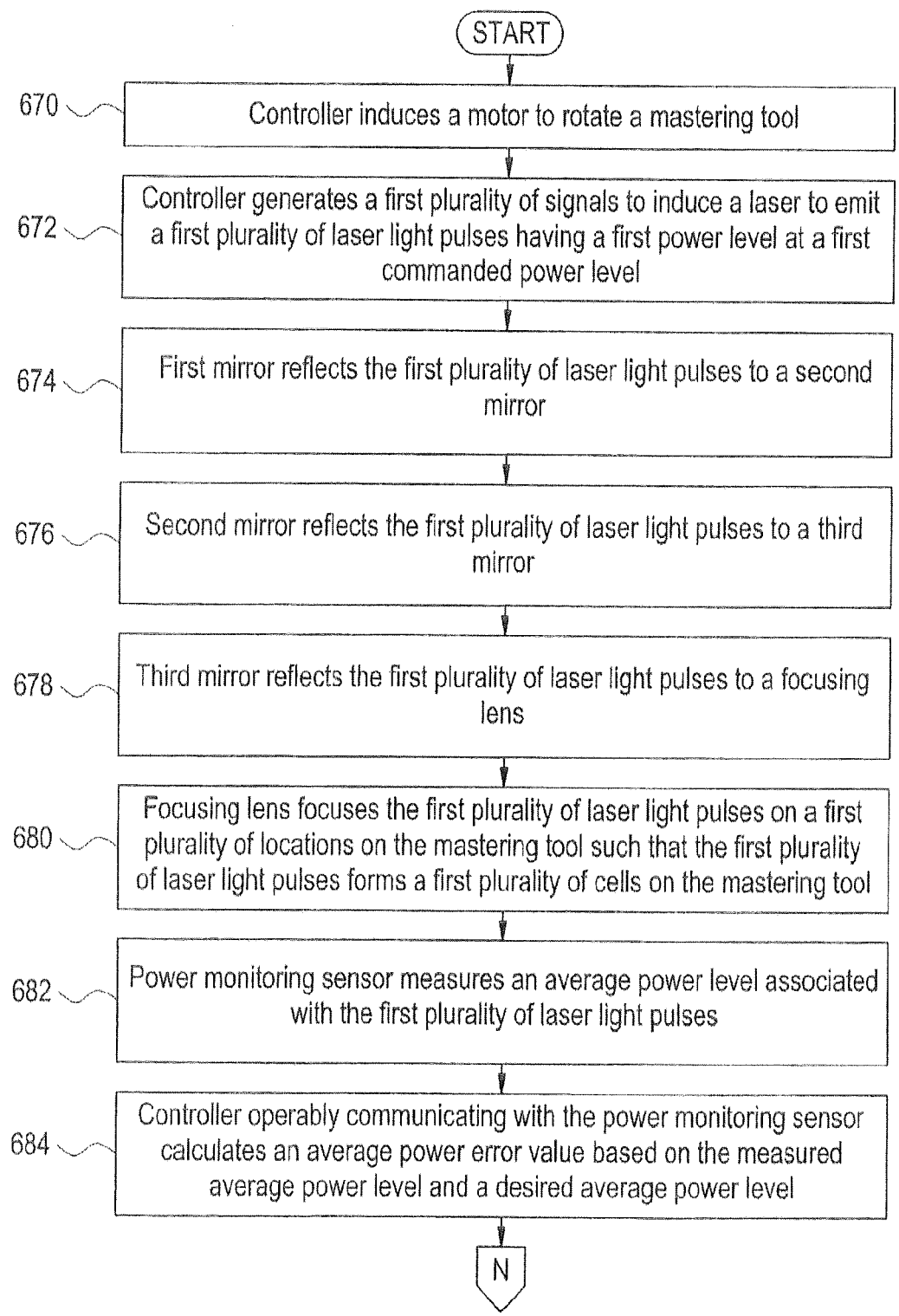
FIGS. 40-41 are flowcharts of a method for forming a plurality of cells on a mastering tool utilizing the system of FIG. 39 in accordance with another exemplary embodiment.
Figure 41:
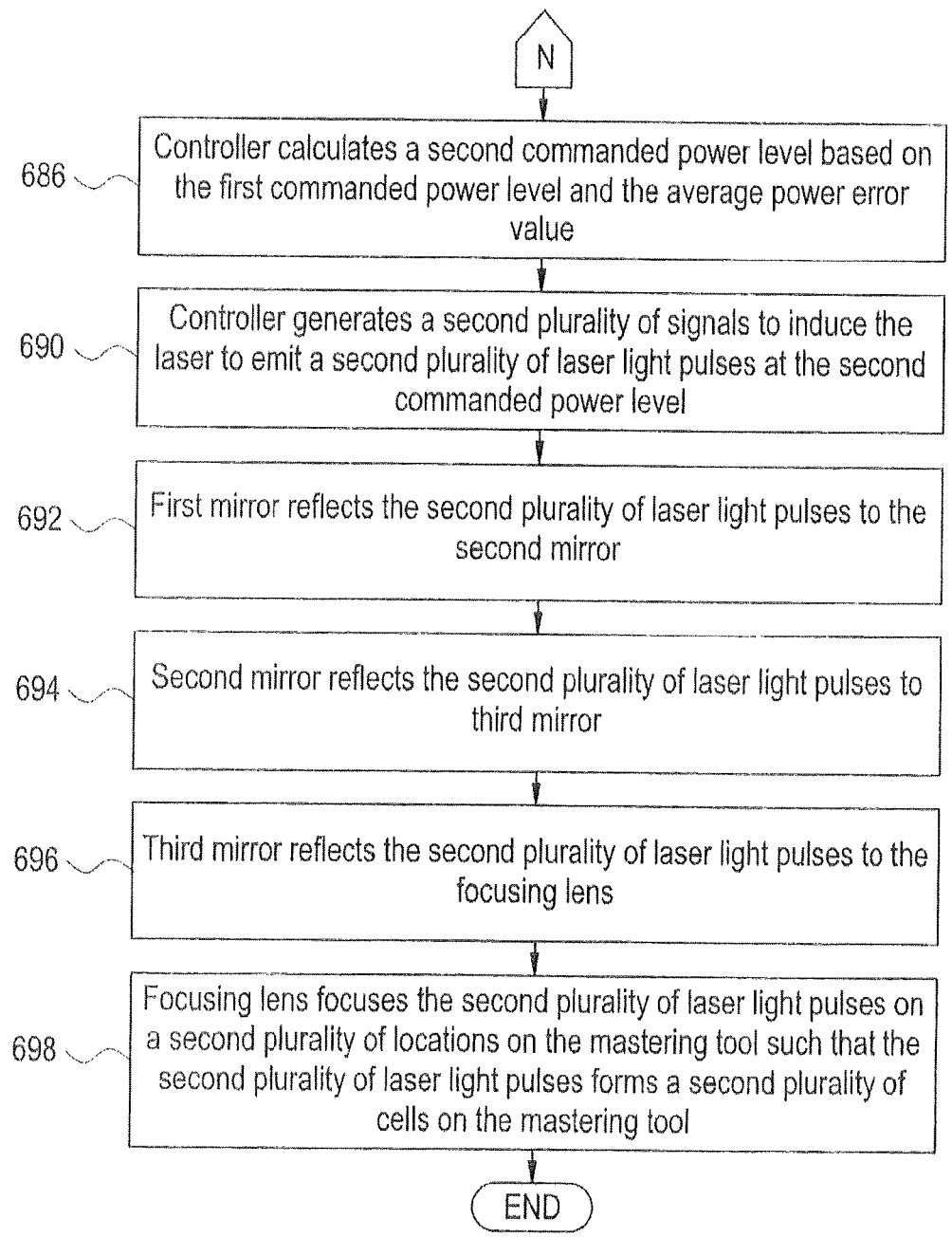

Referring to FIGS. 40-41, a method for forming a plurality of cells on the mastering tool 632 utilizing the system 630 will now be explained.

At step 670, the controller 664 induces the motor 660 to rotate the mastering tool 632.

At step 672, the controller 664 generates a first plurality of signals to induce the laser 640 to emit a first plurality of laser light pulses having a first power level at a first commanded power level.

At step 674, the mirror 648 reflects the first plurality of laser light pulses to the mirror 650.

At step 676, the mirror 650 reflects the first plurality of laser light pulses to the mirror 652.

At step 678, the mirror 652 reflects the first plurality of laser light pulses to the focusing lens 654.

At step 680, the focusing lens 654 focuses the first plurality of laser light pulses on a first plurality of locations on the mastering tool 632 such that the first plurality of laser light pulses forms a first plurality of cells on the mastering tool 632.

At step 682, the power monitoring sensor 646 measures an average power level associated with the first plurality of laser light pulses.

At step 684, the controller 664 operably communicating with the power monitoring sensor 646 calculates an average power error value based on the measured average power level and a desired average power level.

At step 686, the controller 664 calculates a second commanded power level based on the first commanded power level and the average power error value.

At step 690, the controller 664 generates a second plurality of signals to induce the laser 640 to emit a second plurality of laser light pulses at the second commanded power level.

At step 692, the mirror 648 reflects the second plurality of laser light pulses to the mirror 650.

At step 694, the mirror 650 reflects the second plurality of laser light pulses to the mirror 652.

At step 696, the mirror 652 reflects the second plurality of laser light pulses to the focusing lens 654.

At step 698, the focusing lens 654 focuses the second plurality of laser light pulses on a second plurality of locations on the mastering tool 632 such that the second plurality of laser light pulses forms a second plurality of cells on the mastering tool 632. After step 698, the method is exited.

The inventive systems and methods for forming a plurality of cells on a mastering tool represent a substantial advantage over other systems and methods. In particular, the inventive systems and methods have a technical effect of forming a plurality of cells on a mastering tool having varying cell geometry sizes or cell placement locations. As a result, the systems and methods minimize and/or eliminate undesirable banding or patterns on the mastering tools.

As described above, the methods for forming a plurality of cells on a mastering tool can be at least partially embodied in the form of computer-implemented processes and apparatuses for practicing those processes. In the exemplary embodiments, the methods are embodied in computer program code executed by one or more controllers. The present methods may be embodied in the form of computer program code containing instructions embodied in one or more computer-readable mediums such as floppy diskettes, CD-ROMs, hard drives, flash memory, or the like, wherein, when the computer program code is loaded into and executed by a controller, the controller becomes an apparatus for practicing the invention.

A method for forming a plurality of cells on a mastering tool in accordance with an exemplary embodiment is provided. The method includes emitting a first laser light pulse having a first power level toward a light attenuating device. The method further includes generating a first signal having an amplitude that is based on a first amplitude value. The first amplitude value is one of a plurality of amplitude values associated with a predetermined distribution of cell opening sizes within a range of cell opening sizes for the mastering tool. The method further includes attenuating the first laser light pulse to a second power level utilizing a light attenuating device in response to the first signal. The method further includes forming a first cell having a first cell opening size at a first location on the mastering tool utilizing the attenuated first laser light pulse. The method further includes emitting a second laser light pulse having a third power level toward the light attenuating device. The method further includes generating a second signal having an amplitude that is based on a second amplitude value. The second amplitude value is one of the plurality of amplitude values associated with the predetermined distribution of cell opening sizes. The method further includes attenuating the second laser light pulse to a fourth power level utilizing the light attenuating device in response to the second signal. The method further includes forming a second cell having a second cell opening size at a second location on the mastering tool utilizing the attenuated second laser light pulse.

A method for forming a plurality of cells on a mastering tool in accordance with another exemplary embodiment is provided. The method includes emitting a first laser light pulse towards a light position shifting device. The method further includes generating a first signal having an amplitude that is based on a first amplitude value. The first amplitude value is one of a plurality of amplitude values associated with a predetermined distribution of position error distances within a range of position error distances, for cells on the mastering tool. The method further includes adjusting an operational parameter of the light position shifting device in response to the first signal. The method further includes directing the first laser light pulse from the light position shifting device such that the first laser light pulse forms a first cell at a first location on the mastering tool. The method further includes emitting a second laser light pulse towards the light position shifting device. The method further includes generating a second signal having an amplitude that is based on a second amplitude value. The second amplitude value is one of the plurality of amplitude values associated with the predetermined distribution of position error distances for cells on the mastering tool. The method further includes adjusting the operational parameter of the light position shifting device in response to the second signal. The method further includes directing the second laser light pulse from the light position shifting device such that the second laser light pulse forms a second cell at a second location on the mastering tool.

A method for forming a plurality of cells on a mastering tool in accordance with another exemplary embodiment is provided. The method includes emitting a first laser light pulse having a first power level toward a light attenuating device. The method further includes generating a first signal having an amplitude that is based on a first amplitude value. The first amplitude value is one of a plurality of amplitude values associated with a first predetermined distribution of position error distances for cells on the mastering tool within a range of position error distances. The method further includes adjusting an operational parameter of the light position shifting device in response to the first signal. The method further includes generating a second signal having an amplitude that is based on a second amplitude value. The second amplitude value is one of a plurality of amplitude values associated with a second predetermined distribution of cell opening sizes within a range of cell opening sizes for the mastering tool. The method further includes attenuating the first laser light pulse to a second power level utilizing the light attenuating device in response to the second signal. The method further includes directing the attenuated first laser light pulse from the light position shifting device such that the attenuated first laser light pulse forms a first cell having a first cell opening size at a first location on the mastering tool. The method further includes emitting a second laser light pulse having a third power level toward the light attenuating device. The method further includes generating a third signal having an amplitude that is based on a third amplitude value associated with the first predetermined distribution of position error distances for cells on the mastering tool. The method further includes adjusting the operational parameter of the light position shifting device in response to the third signal. The method further includes generating a fourth signal having an amplitude that is based on a fourth amplitude value associated with the second predetermined distribution of cell opening sizes. The method further includes directing the attenuated second laser light pulse from the light position shifting device such that the attenuated second laser light pulse forms a second cell having a second cell opening size at a second location on the mastering tool.

While the invention is described with reference to exemplary embodiments, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiments disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another. Further, the term "operational parameter" can refer to a physical position of a device, an internal state of a device, or an operational voltage level or current level of a device.

What is claimed is:

1. A system for forming a plurality of cells on a mastering tool, comprising:
    a laser configured to emit a first laser light pulse having a first power level, and to emit a second laser light pulse having a third power level;
    a controller configured to operably communicate with the laser configured to generate a first signal having an amplitude that is based on a first amplitude value, the first amplitude value being one of a plurality of amplitude values associated with at least one of (i) a predetermined distribution of cell opening sizes within a range of cell opening sizes for the mastering tool and (ii) a predetermined distribution of position error distances for cells on the mastering tool within a range of position error distances, wherein the controller is further configured to generate a second signal having an amplitude that is based on a second amplitude value, wherein (i) the second amplitude value is one of a plurality of amplitude values associated with the predetermined distribution of cell opening sizes, and/or (ii) the second amplitude value is one of the plurality of amplitude values associated with the predetermined distribution of position error distances for cells on the mastering tool; and
    at least one of
    (i) a light attenuating device configured to receive the first laser light pulse and the first signal, the light attenuating device further configured to attenuate the first laser light pulse to a second power level in response to the first signal, such that the first laser light pulse forms a first cell having a first cell opening size at a first location on the mastering tool, wherein the light attenuating device is further configured to receive the second laser light pulse and the second signal, the light attenuating device further configured to attenuate the second laser light pulse to a fourth power level in response to the second signal such that the second laser light pulse forms a second cell having a second cell opening size at a second location on the mastering tool, and (ii) a light position shifting device operably coupled to a first device, the first device configured to adjust an operational parameter of the light position shifting device in response to the first signal, the light position shifting device configured to direct the first laser light pulse such that the first laser light pulse forms a first cell at a first location on the mastering tool after the operational parameter of the light position shifting device is adjusted in response to the first signal, wherein the light position shifting device further configured to direct the second laser light pulse such that the second laser light pulse forms a second cell at a second location on the mastering tool after the operational parameter of the light position shifting device is adjusted in response to the second signal.

2. The system of claim 1, wherein:
the laser further configured to emit a third laser light pulse having a fifth power level;
the controller further configured to generate a third signal having an amplitude that is based on the first amplitude value associated with the predetermined distribution of cell opening sizes;
the light attenuating device further configured to receive the third laser light pulse and the third signal, the light attenuating device further configured to attenuate the third laser light pulse to a sixth power level in response to the third signal such that the attenuated third laser light pulse further forms the first cell; and
wherein the first power level is greater than or equal to the second power level and the first cell opening size is greater than or equal to the second cell opening size.

3. The system of claim 1, wherein:
the laser is further configured to emit a third laser light pulse;
the controller further configured to generate a third signal having an amplitude that is based on the first amplitude value associated with the predetermined distribution of position error distances for cells on the mastering tool;
the first device further configured to adjust the operational parameter of the light position shifting device in response to the third signal; and
the light position shifting device further configured to direct the third laser light pulse such that the third laser light pulse further forms the first cell after the operational parameter of the light position shifting device is adjusted in response to the third signal.

4. A system for forming a plurality of cells on a mastering tool, comprising:
a laser configured to emit a first laser light pulse having a first power level;
a controller operably communicating with the laser configured to generate a first signal having an amplitude that is based on a first amplitude value, the first amplitude value being one of a plurality of amplitude values associated with a predetermined distribution of cell opening sizes within a range of cell opening sizes for the mastering tool;
a light attenuating device configured to receive the first laser light pulse and the first signal, the light attenuating device further configured to attenuate the first laser light pulse to a second power level in response to the first signal, such that the first laser light pulse forms a first cell having a first cell opening size at a first location on the mastering tool;
the laser further configured to emit a second laser light pulse having a third power level;
the controller further configured to generate a second signal having an amplitude that is based on a second amplitude value, the second amplitude value being one of a plurality of amplitude values associated with the predetermined distribution of cell opening sizes; and
the light attenuating device further configured to receive the second laser light pulse and the second signal, the light attenuating device further configured to attenuate the second laser light pulse to a fourth power level in response to the second signal such that the second laser light pulse forms a second cell having a second cell opening size at a second location on the mastering tool.

5. The system of claim 4, wherein:
the laser further configured to emit a third laser light pulse having a fifth power level;
the controller further configured to generate a third signal having an amplitude that is based on the first amplitude value associated with the predetermined distribution of cell opening sizes; and
the light attenuating device further configured to receive the third laser light pulse and the third signal, the light attenuating device further configured to attenuate the third laser light pulse to a sixth power level in response to the third signal such that the attenuated third laser light pulse further forms the first cell.

6. The system of claim 4, wherein the first power level is greater than or equal to the second power level and the first cell opening size is greater than or equal to the second cell opening size.

7. A system for forming a plurality of cells on a mastering tool, comprising:
a laser configured to emit a first laser light pulse;
a controller operably communicating with the laser configured to generate a first signal having an amplitude that is based on a first amplitude value, the first amplitude value being one of a plurality of amplitude values associated with a predetermined distribution of position error distances for cells on the mastering tool within a range of position error distances;
a light position shifting device operably coupled to a first device, the first device configured to adjust an operational parameter of the light position shifting device in response to the first signal, the light position shifting device configured to direct the first laser light pulse such that the first laser light pulse forms a first cell at a first location on the mastering tool after the operational parameter of the light position shifting device is adjusted in response to the first signal;
the laser further configured to emit a second laser light pulse;
the controller further configured to generate a second signal having an amplitude that is based on a second amplitude value, the second amplitude value being one of the plurality of amplitude values associated with the predetermined distribution of position error distances for cells on the mastering tool;
the first device further configured to adjust the operational parameter of the light position shifting device in response to the second signal; and
the light position shifting device further configured to direct the second laser light pulse such that the second laser light pulse forms a second cell at a second location on the mastering tool after the operational parameter of the light position shifting device is adjusted in response to the second signal.

8. The system of claim 7, wherein:
the laser is further configured to emit a third laser light pulse;
the controller further configured to generate a third signal having an amplitude that is based on the first amplitude value associated with the predetermined distribution of position error distances for cells on the mastering tool;
the first device further configured to adjust the operational parameter of the light position shifting device in response to the third signal; and
the light position shifting device further configured to direct the third laser light pulse such that the third laser light pulse further forms the first cell after the operational parameter of the light position shifting device is adjusted in response to the third signal.

9. The system of claim 1, comprising the light attenuating device.

10. The system of claim 1, comprising the light position shifting device.

* * * * *